US012067878B1

(12) United States Patent
Campbell

(10) Patent No.: US 12,067,878 B1
(45) Date of Patent: Aug. 20, 2024

(54) CROWD SOURCED REAL-TIME PARKING SPACE DETECTION AND NOTIFICATION

(71) Applicant: Waylens, Inc., Waltham, MA (US)

(72) Inventor: Jeffery R. Campbell, Warkworth (CA)

(73) Assignee: WAYLENS, INC., Waltham, MA (US)

( * ) Notice: Subject to any disclaimer, the term of this patent is extended or adjusted under 35 U.S.C. 154(b) by 644 days.

(21) Appl. No.: 17/367,168

(22) Filed: Jul. 2, 2021

Related U.S. Application Data

(63) Continuation-in-part of application No. 17/233,084, filed on Apr. 16, 2021, now Pat. No. 11,803,617, which is a continuation-in-part of application No. 16/197,534, filed on Nov. 21, 2018, now Pat. No. 11,010,643, which is a continuation-in-part of application No. 16/158,546, filed on Oct. 12, 2018, now abandoned, and a continuation-in-part of application No. 16/157,777, filed on Oct. 11, 2018, now Pat. No. 11,416,542, and a continuation-in-part of application No. 16/156,254, filed on Oct. 10, 2018, now Pat. No. 11,250,054, and a continuation-in-part of application No. 16/106,777, filed on Aug. 21, 2018, now abandoned, and a continuation-in-part of application No. 15/618,286, filed on Jun. 9, 2017, now Pat. No. 11,151,192, and a continuation-in-part of application No. 15/591,459, filed on May 10, 2017, now Pat. No. 11,856,331.

(60) Provisional application No. 62/572,768, filed on Oct. 16, 2017, provisional application No. 62/571,891, filed on Oct. 13, 2017, provisional application No. 62/571,884, filed on Oct. 13, 2017, provisional application No. 62/548,548, filed on Aug. 22, 2017.

(51) Int. Cl.
  *G08G 1/14* (2006.01)
(52) U.S. Cl.
  CPC .................................. *G08G 1/143* (2013.01)
(58) Field of Classification Search
  CPC ...................................................... G08G 1/143
  See application file for complete search history.

(56) References Cited

U.S. PATENT DOCUMENTS

| | | | |
|---|---|---|---|
| 9,581,997 B1 * | 2/2017 | Penilla | G06Q 10/20 |
| 9,961,507 B1 * | 5/2018 | Mendelson | H04W 4/029 |
| 10,354,531 B1 * | 7/2019 | Bronder | G06F 16/29 |
| 11,132,900 B2 * | 9/2021 | Bender | G08G 1/143 |
| 2014/0365111 A1 * | 12/2014 | McClernon | H04W 64/00 |
| | | | 701/487 |

(Continued)

*Primary Examiner* — Eliyah S. Harper
(74) *Attorney, Agent, or Firm* — Maiorana Patent Law, PA

(57) ABSTRACT

A system comprising a capture device and a database. The capture device may be configured to capture video, implement a processor to perform video analysis on the captured video to extract metadata, and store the captured video. The database may be configured to receive the metadata from the wireless communication device, analyze the metadata, determine a location of an available parking space in response to the analysis of the metadata and a current location of a parking user and communicate the location of the available parking space to the parking user. The metadata may be extracted by the processor to generate information about objects present in the video and uploaded to the database for storage without the captured video. The processor may detect a status of a plurality of parking spaces and determine whether each of the plurality of parking spaces is the available parking space.

20 Claims, 16 Drawing Sheets

(56) References Cited

U.S. PATENT DOCUMENTS

| | | | |
|---|---|---|---|
| 2015/0294431 A1* | 10/2015 | Fiorucci | G07B 15/02 705/13 |
| 2016/0012726 A1* | 1/2016 | Wang | G08G 1/0141 340/932.2 |
| 2016/0334230 A1* | 11/2016 | Ross | G05D 1/0027 |
| 2016/0334797 A1* | 11/2016 | Ross | G06Q 30/0283 |
| 2017/0132541 A1* | 5/2017 | Myers | G08G 1/14 |
| 2017/0148241 A1* | 5/2017 | Kerning | H04W 12/08 |
| 2017/0243485 A1* | 8/2017 | Rubin | H04W 4/46 |
| 2022/0076282 A1* | 3/2022 | Monassebian | G06Q 30/0201 |

\* cited by examiner

CROWD SOURCED REAL-TIME PARKING SPACE DETECTION AND NOTIFICATION

This application relates to U.S. Ser. No. 17/233,084, filed Apr. 16, 2021, which relates to U.S. Ser. No. 16/197,534, filed Nov. 21, 2018, which relates to U.S. Ser. No. 16/158,546, filed Oct. 12, 2018, which relates to U.S. Provisional Application No. 62/572,768, filed Oct. 16, 2017. This application also relates to U.S. Ser. No. 16/157,777, filed Oct. 11, 2018, which relates to U.S. Provisional Application No. 62/571,891, filed Oct. 13, 2017. This application also relates to U.S. Ser. No. 16/156,254, filed Oct. 10, 2018, which relates to U.S. Provisional Application No. 62/571,884, filed Oct. 13, 2017. This application also relates to U.S. Ser. No. 16/106,777, filed Aug. 21, 2018, which relates to U.S. Provisional Application No. 62/548,548, filed Aug. 22, 2017. This application also relates to U.S. Ser. No. 15/618,286, filed Jun. 9, 2017. This application also relates to U.S. Ser. No. 15/591,459, filed May 10, 2017. Each of the mentioned applications are hereby incorporated by reference in their entirety.

FIELD OF THE INVENTION

The invention relates to video capture generally and, more particularly, to a method and/or apparatus for implementing crowd sourced real-time parking space detection and notification.

BACKGROUND

Parking has become a difficult issue to address. Commuters want ample parking. Large parking lots can make life easier for patrons of various businesses. However, property is expensive and parking lots take up a large amount of space that could serve other purposes. While cities want to be 'drivable', announcements about adding parking lots and parking garages are not usually met with enthusiasm. Furthermore, rules about which side of the road to park on, hours when parking is allowed, parking fees, and the potential for receiving a ticket for illegal parking can make life difficult for drivers. Parking difficulties are particularly frustrating when a driver is visiting an unfamiliar city or an unfamiliar area in a city. In large cities, parking spaces come at a premium, with prices for parking spots rising to hundreds of thousands of dollars.

Finding a parking spot in crowded urban environments where and when a driver needs one is difficult for drivers. Piloting a vehicle in a crowded urban environment safely while also looking for available parking spaces is dangerous to the driver and society. Visually scanning for open spaces and reading parking signs distracts the driver from watching the road. Drivers do not know when and where spots will be open. Parking spaces that are often available at a particular time of day might not be available at another time of day. Frustration and road rage incidents can arise when a parking spot becomes available and another driver 'steals' the open spot from a driver that had been waiting.

It would be desirable to implement crowd sourced real-time parking space detection and notification.

SUMMARY

The invention concerns a system comprising a capture device and a database. The capture device may be configured to capture video, implement a processor configured to perform video analysis on the captured video to extract metadata corresponding to the captured video, store the captured video and communicate with a wireless communication device. The database may be configured to communicate with the wireless communication device, receive the metadata from the wireless communication device, analyze the metadata, determine a location of an available parking space in response to the analysis of the metadata and a current location of a parking user and communicate the location of the available parking space to the parking user. The metadata may be extracted by the processor of the capture device to generate information about objects present in the captured video and uploaded to the database for storage without the captured video. The processor may be configured to perform computer vision on the objects present in the captured video to detect a status of a plurality of parking spaces and determine whether each of the plurality of parking spaces is the available parking space. The capture device may be implemented in a first vehicle of a scanning user. The parking user may be in a second vehicle having the current location different than a scanning location of the first vehicle.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
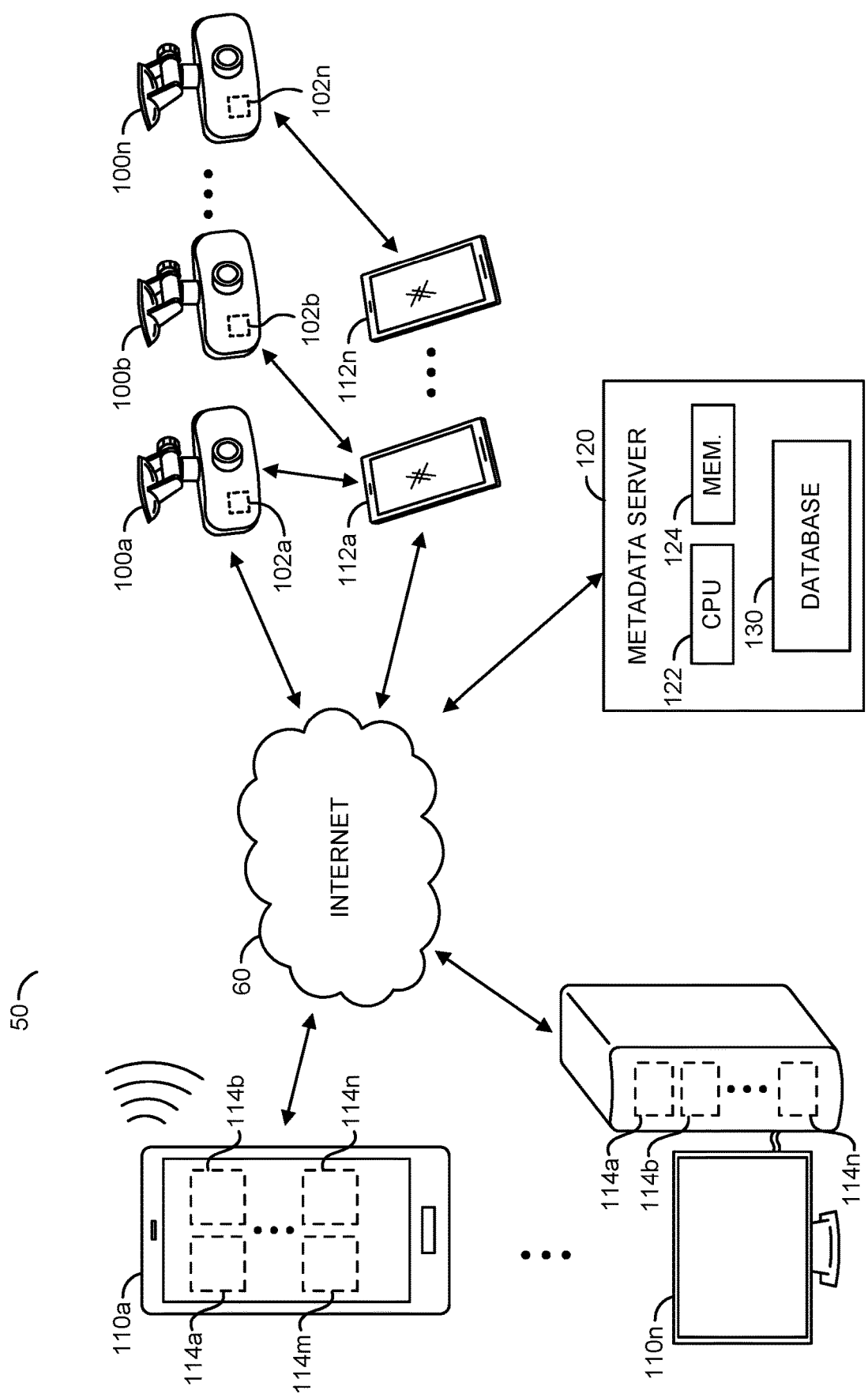
FIG. 1 is a diagram illustrating an example system in accordance with an embodiment of the present invention.

Embodiments of the present invention include providing crowd sourced real-time parking space detection and notification that may (i) guide a driver to an available parking space, (ii) indicate where and when parking spaces are more likely to be available, (iii) rely on crowd-sourcing to gather information about parking spaces, (iv) extract metadata about parking space availability and upload the metadata without uploading video data, (v) reward users for holding parking spaces for other users, (vi) enable drivers to plan errands around parking space availability, (vii) enable drivers to locate parking spaces for other drivers, (viii) improve road safety by handing off parking spot searching to a cloud-computing service and/or (ix) be implemented as one or more integrated circuits.

Embodiments of the present invention may be configured to implement a system for automatically providing guidance to a driver for parking. In one example, the system may automatically guide a driver to a free parking space. In another example, the system may automatically guide a driver towards a locality that has a high probability open parking spaces.

Embodiments of the present invention may identify, manage and/or recommend parking spaces for users. The parking space identification, management and/or recommendations may be implemented using centrally networked computers. In one example, the system may be implemented using cloud computing resources. The system may be configured to track and/or keep statistics about an availability of free parking spaces using up-to-date real-time information collected from a crowd sourced network of users. The users may collect information using vehicles equipped with vision-based analytics. In an example, the vision-based analytics may be implemented as part of an on-board camera system. Each vehicle may be equipped with the on-board camera system. The video analytics may be used to collect data about currently available parking spaces (e.g., a detected available parking space) and/or data that may be compiled to provide historical data about available parking spaces (e.g., current information about the parking space may not be available, but a probability of the space being available may be determined using the historical data).

In some embodiments, the system may enable a driver that is searching for a parking space to initiate a request for a parking space. In response to the request for a parking space, other drivers using the system in the vicinity may be queried to hold a parking space. If a driver is leaving a parking spot, the request may ask the driver to delay leaving, in order to occupy the parking spots and to hold the spot for a short time until the requesting driver arrives. Each user may subscribe to the system in order to send and receive requests for holding a parking space.

Embodiments of the present invention may implement a real-time system configured to notify drivers of available parking spots in specific locations. Visual and/or auditory cues may be provided in order to indicate a probability of available parking spots in a locality. The availability of parking spaces may be determined using real-time and historical data sets generated from crowd sourced data. The crowd sourced data may be accumulated using computer vision analytics from dash cameras or on-board OEM installed camera systems implemented by the vehicle of each user.

Multiple users each implementing vehicle-based cameras may drive in a given locality. The vehicle-based cameras may be configured to perform vision-based analytics. The vision-based analytics may be configured to detect and identify parked, stationary vehicles, geolocate detected vehicles and/or transmit the captured information over a network to a database in real time. Available parking spaces may be detected by using recent and historical data by flagging the absence of a stationary, curbside vehicle as detected (or not detected) by vision based vehicle detection analytics.

Generally, the drivers capturing the video may drive normally (e.g., drive without any additional detours or routes than the driver would otherwise use for daily commuting and/or running errands). With a large user base, numerous drivers may enable the collection of large-scale data about parking space availability. In some embodiments, some users may be offered incentives for driving to particular locations to gather information (e.g., gather information about less commonly traversed areas). In one example, a driver may be requested to take an alternate route while running an errand (e.g., take a side street on the way to driving to a store instead of taking the more commonly used roads). In another example, a driver may be requested to travel to take a dedicated trip to a particular location (e.g., a driver may drive around for no other purpose than to gather data). Various rewards and/or incentives may be provided for providing data.

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement video capture devices. The blocks 110a-110n may implement subscriber devices (e.g., subscriber communication devices). The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 110a-110n and/or the user communication devices 112a-112n may be configured to execute computer readable instructions (e.g., executable programs, apps, binaries, etc.). For example, the subscriber devices 110a-110n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 110a-110n and/or the user communication devices 112a-112n may be implemented as a vehicle capable of 3G/4G/LTE/5G communication (e.g., a vehicle with a touchscreen infotainment system). Generally, the subscriber devices 110a-110n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 110a-110n and/or the user communication devices 112a-112n may have similar implementations. For example, the user communication devices 112a-112n may be wireless communication devices. The type and/or features of the subscriber devices 110a-110n and/or the user communication devices 112a-112n may be varied according to the design criteria of a particular implementation.

Each of the subscriber devices 110a-110n may be configured to connect to the network 60 (e.g., hard-wired, Wi-Fi, etc.). The subscriber devices 110a-110n may be configured to store and/or execute the computer readable instructions 114a-114n. Executing the computer readable instructions 114a-114n may enable the subscriber devices 110a-110n to display various interfaces, generate output and/or receive input. For example, the app 114a may be a front-end for interacting with the system 50.

Each of the capture devices 100a-100n may be configured to capture video data. In some embodiments, the capture devices 100a-100n may be implemented as vehicle-mounted cameras (e.g., dashcams) to record video while a user drives the vehicle. In one example, each vehicle may be equipped with one of the capture devices 100a-100n. In another example, one vehicle may be equipped with more than one of the capture devices 100a-100n (e.g., to capture multiple fields of view and/or perspectives from the vehicle). In some embodiments, the capture devices 100a-100n may be cameras mounted at stationary locations (e.g., security cameras mounted on buildings). For example, the stationary camera may generate metadata used to determine roadway data. The implementation of the capture devices 100a-100n may be varied according to the design criteria of a particular implementation.

In some embodiments, the capture devices 100a-100n may be configured to communicate directly with the network 60. For example, the capture devices 100a-100n may comprise components implementing Wi-Fi communication and/or 3G/4G/LTE/5G (e.g., cellular) communication. In some embodiments, the capture devices 100a-100n may be configured to communicate indirectly with the network 60. For example, the capture devices 100a-100n may comprise short-range communication such as Bluetooth and/or Wi-Fi (e.g., short-range communication to a tethered device such as a smartphone). A cost of manufacturing the capture devices 100a-100n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 100a-100n may be lower when Bluetooth alone and/or Bluetooth/Wi-Fi is implemented compared to a camera that implements 3G/4G/LTE/5G hardware. Implementing the capture devices 100a-100n with a low cost may enable users to buy more than one of the capture devices 100a-100n and/or provide a larger user base. When the system 50 has more of the capture devices 100a-100n available to capture video data and/or provide metadata, more data points may be available for analysis. Generally, having more data points enables more useful analytical results generated by the system 50. In some embodiments, the capture devices 100a-100n may comprise a display and/or an input interface. For example, the capture devices 100a-100n may be configured to run apps (e.g., the computer executable instructions 114a-114n). In another example, the capture devices 100a-100n may be implemented as smartphones configured as cameras.

Each of the user communication devices 112a-112n may be configured to connect to the network 60 and/or the capture devices 100a-100n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, ZigBee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 100a-100n. In some embodiments, the user communication devices 112a-112n may be configured to send/receive data to/from the internet 60. For example, the user communication devices 112a-112n may receive data (e.g., video data, metadata, etc.) from one or more of the capture devices 100a-100n and transmit the data to the internet 60. In another example, the user communication devices 112a-112n may receive data (e.g., data requests, interrupt requests, firmware updates, etc.) from the internet 60 and transmit the data to the capture devices 100a-100n.

Generally, the user communication devices 112a-112n are implemented as portable devices (e.g., carried by a person, mounted in a vehicle, battery powered, etc.). The user communication devices 112a-112n may be configured to execute the computer readable instructions 114a-114n. In one example, the subscriber devices 110a-110n may store and/or execute one version (e.g., a subscriber version) of an app (e.g., the computer readable instructions 114a) and the user communication devices 112a-112n may store and/or execute another version (e.g., a provider version) of an app (e.g., the computer readable instructions 114b). One of the user communication devices 112a-112n may be configured to communicate with more than one of the capture devices 100a-100n (e.g., one smartphone may connect to multiple vehicle-mounted cameras in the same vehicle). In the example shown, the smartphone 112a communicates with the capture device 100a and the capture device 100b (e.g., the driver may have the smartphone and the vehicle may have two vehicle-mounted cameras). The connections between the user communication devices 112a-112n and/or the capture devices 100a-100n may be varied according to the design criteria of a particular implementation.

Each of the capture devices 100a-100n may comprise a respective block (or circuit) 102a-102n. The circuits 102a-102n may implement video processor functionality. In some embodiments, the circuits 102a-102n may be a system-on-chip (SoC). For example, the circuits 102a-102n may comprise input/output, a memory, processors, etc. The components and/or functionality of the circuits 102a-102n may be varied according to the design criteria of a particular implementation.

The circuits 102a-102n may be configured to record, encode, decode, transmit and/or store video data. The circuits 102a-102n may be configured to perform video analysis and/or video analytics. For example, the circuits 102a-102n may process video, identify patterns in the video data and/or recognize objects captured by the video data. Heuristics, templates and/or comparisons may be performed by the circuits 102a-102n to recognize and/or identify objects in captured video frames (e.g., video data) as objects that can be perceived by humans. In one example, the circuits 102a-102n may identify an object as a vehicle (or part of a vehicle such as a hood, a license plate, etc.). In another example, the circuits 102a-102n may identify text, shapes and/or colors. In yet another example, the circuits 102a-

102*n* may identify objects (e.g., signs, pedestrians, streetlights, etc.). The video data captured by the circuits 102*a*-102*n* may be stored by the capture devices 100*a*-100*n*. In one example, the circuits 102*a*-102*n* may implement a memory. In another example, the circuits 102*a*-102*n* may connect to an external memory (e.g., the capture devices 100*a*-100*n* may be configured to receive a flash memory such as a SD card, a microSD card, NAND memory, Compact Flash (CF) and/or an XD card).

The circuits 102*a*-102*n* may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 102*a*-102*n* may comprise a GPS unit to determine GPS coordinates, a magnetometer to determine direction of travel and/or a real time clock (RTC) circuit to determine time.

The circuits 102*a*-102*n* may be configured to detect license plates. License plates may be detected, and the alphanumeric characters and/or symbols on the license plate may be identified. The license plate alphanumeric characters and/or symbols may be extracted from the captured video data as the metadata. For example, the circuits 102*a*-102*n* may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the cameras 100*a*-100*n* when the video was recorded. The circuits 102*a*-102*n* may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, JavaScript, PHP, SQL, AJAX applications, APIs, etc. The server 120 may be configured to distribute apps (e.g., one or more of the computer readable instructions 114*a*-114*n*) to the subscriber devices 110*a*-110*n* and/or the user communication devices 112*a*-112*n*. The server 120 may be configured to generate interfaces (e.g., graphical user interfaces) based on stored data for the subscriber devices 110*a*-110*n*. For example, the server 120 may generate data to implement an interface, the data may be sent to the subscriber devices 110*a*-110*n*, the subscriber devices 110*a*-110*n* may interpret the data to generate a user interface, the user may interact with the user interface to provide requests, the subscriber devices 110*a*-110*n* may transmit the requests to the server 120 and the server may process the requests. Similarly, the capture devices 100*a*-100*n* and/or the user communication devices 112*a*-112*n* may interpret data from the server 120 to implement an interface. The processing capabilities and/or functionality of the server 120 may be varied according to the design criteria of a particular implementation.

The server 120 may comprise a block (or circuit) 122, a block (or circuit) 124 and/or a block (or circuit) 130. The circuit 122 may implement a CPU. The circuit 124 may implement a memory. The circuit 130 may implement a database (e.g., a remote database). The database 130 may store data and/or filter the stored data in response to search parameters. Details of the database 130 may be described in association with FIG. 2. Generally, the database 130 may store data provided by the capture devices 100*a*-100*n*. In an example, the database 130 may store the metadata. Search parameters may be transmitted by the subscriber devices 110*a*-110*n* and the database 130 may be searched based on the search parameters. For example, the database 130 may enable the metadata to be associated with the video data stored by (and located on) the capture devices 100*a*-100*n*.

The CPU 122 may be configured to execute computer readable instructions. The computer readable instructions, when executed by the CPU 122 may be configured to perform various computational tasks used to implement the system 50 and/or to manage the database 130. The CPU 122 may be configured to input data into the database 130, retrieve data from the database 130, compare data in the database 130 and/or analyze data stored in the database 130. In an example, the CPU 122 may be configured to read the metadata stored in the database 130 to determine the types of objects detected by the circuits 102*a*-102*n*, determine a location of the objects detected, determine characteristics of the objects detected, etc. The CPU 122 may be configured to perform statistical analysis on the metadata. The CPU 122 may be configured to determine which of the cameras 100*a*-100*n* provided particular metadata entries. While the CPU 122 is shown, the processing may be performed by a GPU, an ASIC and/or other types and/or combinations of hardware. The functions performed by the CPU 122 may be varied according to the design criteria of a particular implementation.

The memory 124 may implement a random access memory for the metadata server 120. The memory 124 may be configured to provide the computer readable instructions to the CPU 122. In the example shown, the CPU 122 and the memory 124 are shown as discrete devices implemented by one metadata server. In some embodiments, the CPU 122 and/or the memory 124 may be shared across multiple server computer devices. For example, the CPU 122 and/or the memory 124 may be implemented as scalable computing resources shared across a cloud computing cluster that implements the metadata server 120.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 100a-100n to program participants (e.g., the users and/or the data producers). The data producers may install the capture devices 100a-100n. For example, the data producers may install the capture devices 100a-100n on vehicles as dashcams. The capture devices 100a-100n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 100a-100n).

The data producers may use the capture devices 100a-100n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 110a-110n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 110a-110n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 110a-110n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 100a-100n captured the video based on the video metadata (e.g., the metadata may comprise an ID of a camera and/or user that captured the video). The server 120 may send a request to the user communication devices 112a-112n and/or the capture devices 100a-100n to upload the recorded video. If the capture devices 100a-100n still have the requested video stored, a video upload may be initiated. The recorded video may be trickled (e.g., uploaded as a low priority data transfer) from the corresponding one of the capture devices 100a-100n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 100a-100n may be implemented with inexpensive hardware powerful enough to perform video analytics (e.g., license plate recognition (LPR)). The video analytics may be performed in real time, while capturing the video data. In one example, the capture devices 100a-100n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 100a-100n into a money making tool. For example, in the system 50 the drivers may own the capture devices 100a-100n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 100a-100n may be configured to overwrite stored video as new video data is captured (e.g., a loop recording). In an example of 40 hours of driving per week with the capture devices 100a-100n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 100a-100n. The provider of the system 50 may curate the resulting data generated by the data providers.

Figure 2:
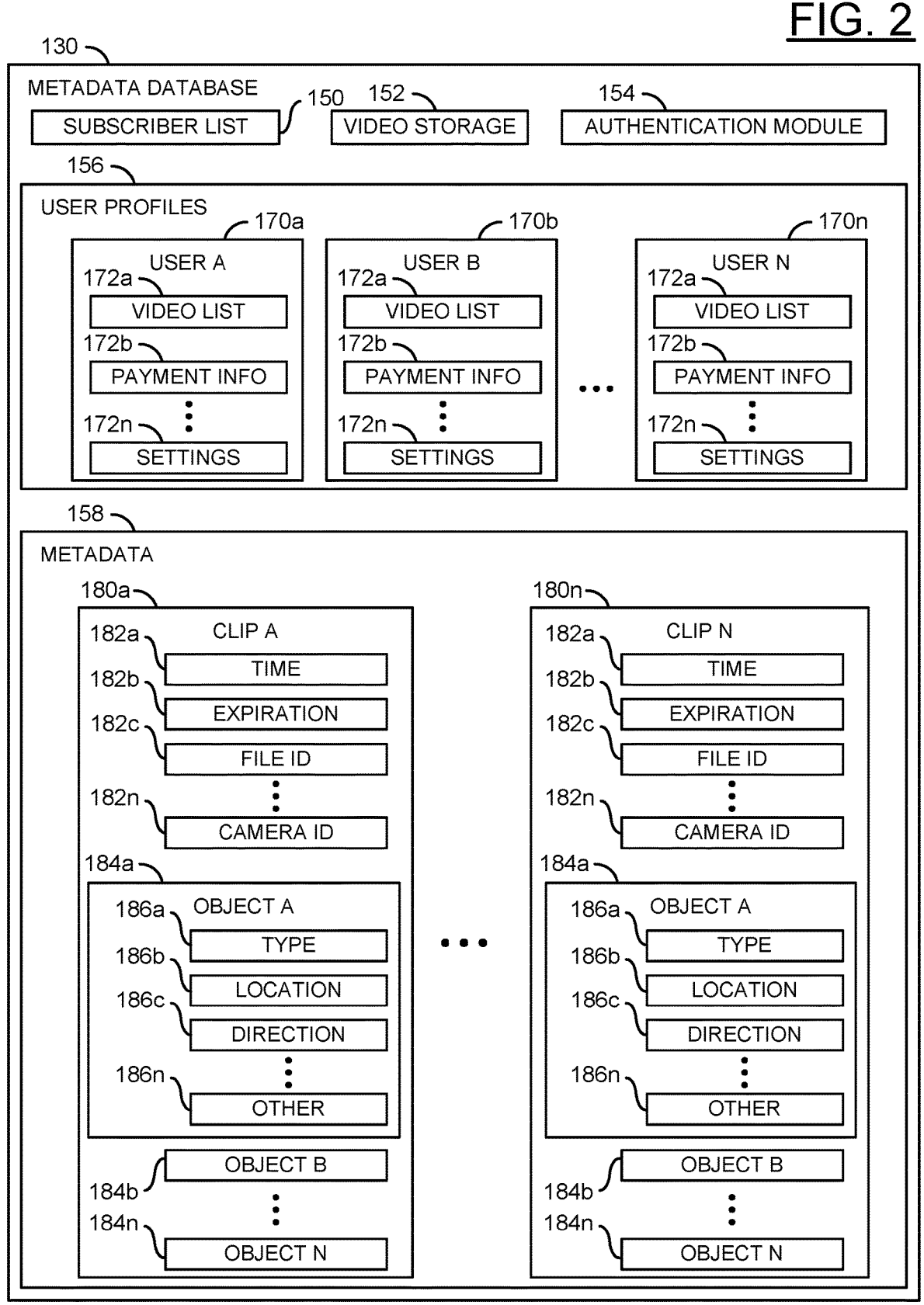
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156 and/or a block (or circuit) 158. The block 150 may comprise a subscriber list. The block 152 may comprise video storage. The block 154 may comprise an authentication module. The block 156 may comprise user profiles. The block 158 may comprise plate and/or object metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 114a to enable the subscriber user to access the database 130 from the subscriber device 110a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 100a-100n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 110a-110n by providing a username, a password, and an additional key (e.g., a text message with a passcode provided to the smartphone 110a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172a may be used to send a request to the capture devices 100a-100n and/or the user communication devices 112a-112n to upload the recorded video data. In another example, the video list 172a may be used to provide a payment to the particular data provider that captured the requested video data. In an example, the data set 172b may store payment information. The payment information 172b may associate credit card, electronic payment (e.g., PayPal, Bitcoin, Apple Pay, Google Wallet, etc.) and/or bank information with a particular one of the data provider users. The payment information 172b may be used to facilitate payments to the data provider that has uploaded a requested recorded video.

In some embodiments, the data provider may receive one of the capture devices 100a-100n in exchange for providing the payment information 172b and if enough video data is provided (e.g., provided on a consistent basis) the data collector user may not be charged. If the capture device is not used enough (or not used regularly, a charge may be incurred (e.g., due to inactivity). In an example, the data provider may receive one of the capture devices 100a-100n free of charge and be able to use the camera as a regular dashcam as well as for providing data for the system 50. In one example, the data provider may not be charged for one of the capture devices 100a-100n for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172b may be stored to charge a penalty fee to encourage the data provider to provide data.

In an example, the data set 172n may comprise user settings. The user settings 172n may provide a configuration and/or preferences for each of the data providers 170a-170n. The data sets 172a-172n may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172a-172n of each of the data provider profiles 170a-170n may be varied according to the design criteria of a particular implementation.

The metadata 158 may store information about various captured videos (e.g., video clips) 180a-180n. The video clips 180a-180n may not be the actual video data (e.g., the actual video data may be stored with the video storage 152). The video clips 180*a*-180*n* may comprise information about the video clips and/or information about objects detected in the video clips by the capture devices 100*a*-100*n*.

In some embodiments, each video clip metadata 180*a*-180*n* that is captured and/or uploaded by the capture devices 100*a*-100*n* may be stored by the database 130. The video data associated with the video clip metadata 180*a*-180*n* may be stored in the video storage 152. Generally, the video data in the video storage 152 may be stored temporarily. For example, video data may have a relatively large file size and storing video data indefinitely may be impractical. However, the video clip metadata 180*a*-180*n* may have a much smaller file size than the video data. The video clip metadata 180*a*-180*n* may be configured to provide sufficient information about the video data to re-create the positioning of various objects in the video data even after the video data is no longer available.

Every time video data is uploaded to the database 130, the corresponding video metadata 180*a*-180*n* may be stored by the database 130. The video metadata 180*a*-180*n* may be stored long-term compared to the video data. In some embodiments, the metadata 158 may be organized by detected objects instead of the video clip metadata 180*a*-180*n*. In one example, where the objects detected are license plates, each time a license plate is detected a new metadata entry may be created. For example, each of the license plate entries may comprise the associated clips 180*a*-180*n*. The clips 180*a*-180*n* may comprise metadata entries for each time a license plate has been read by one of the capture devices 100*a*-100*n*. For example, each time a license plate is detected, a new one of the clips 180*a*-180*n* may be appended to the corresponding one of the license plate entries. Similarly, if the objects detected are vehicles then the video clips 180*a*-180*n* may be associated with a particular vehicle. The arrangement of the metadata 158 may be varied according to the design criteria of a particular implementation.

Each video clip 180*a*-180*n* is shown comprising metadata 182*a*-182*n*. The clip metadata 182*a*-182*n* may comprise the data extracted by the capture devices 100*a*-100*n* from the video recorded by the capture devices 100*a*-100*n* and/or data associated with the video recorded by the capture devices 100*a*-100*n*. The video clip metadata 182*a*-182*n* may be configured to provide useful information about the video clips that have been uploaded.

In one example, the video clip metadata 182*a* may comprise a time. The time 182*a* may indicate a date and/or time of day when the corresponding video was recorded (e.g., a timestamp). The time 182*a* may be used to find recorded video that occurred at a particular time. In another example, the video metadata 182*b* may comprise an expiration flag. The expiration flag 182*b* may indicate whether or not the recorded video is still available (e.g., stored in the memory of the capture device, stored in the video storage 152, has not been overwritten, etc.). For example, the expiration flag 182*b* may have a particular value (e.g., a logical one value) if the video has been overwritten. If the expiration flag 182*b* indicates that the recorded video is no longer available, the video clip metadata 180*a*-180*n* may still provide useful information. The video clip metadata 182*c* may provide a file ID. The file ID 182*c* may be used to associate the video clip metadata 180*a*-180*n* to a particular stored video file (e.g., either in the video storage 152 and/or in the memory of the cameras 100*a*-100*n*). For example, if the expiration flag 182*b* indicates the video data is still available then the file ID 182*c* may be used to retrieve the video data. The video clip metadata 182*n* may provide a camera ID. The camera ID 182*n* may be used to associate the video clip metadata 180*a*-180*n* to a particular one of the cameras 100*a*-100*n* (e.g., the camera that captured the video data associated with the metadata). The camera ID 182*n* may enable the video data to be retrieved from the capture devices 100*a*-100*n* (if the video is still available) and/or to enable the data provider to be contacted for more information (or provide payment to the data provider user). The number and/or type of video clip metadata 182*a*-182*n* available may be varied according to the design criteria of a particular implementation.

The video clip metadata 180*a*-180*n* may comprise a number of objects 184*a*-184*n*. The objects 184*a*-184*n* may correspond to each object detected using the video analysis performed by the capture devices 100*a*-100*n*. In one example, the object 184*a* may be a particular vehicle detected in the video data. In another example, the object 184*b* may be a particular pedestrian detected in the video data. In yet another example, the object 184*c* may be a license plate detected in the video data. In still another example, the object 184*n* may be a particular sign and/or landmark detected in the video data. The number and/or types of objects 184*a*-184*n* stored with the video clip metadata 180*a*-180*n* may be varied according to the design criteria of a particular implementation.

Each of the objects 184*a*-184*n* may have associated object information 186*a*-186*n*. In an example, the object information 186*a* may correspond to an object type (e.g., a person, a vehicle, a building, a sign, a billboard, a license plate, etc.). The object type 186*a* may provide details about the associated objects 184*a*-184*n*. In one example, if the object is a vehicle, the object type 186*a* may indicate the make, model, year, color, license plate, number of passengers, distinctive markings, etc. The object information 186*b* may correspond to a location. The location 186*b* may comprise GPS coordinates corresponding to the object in the recorded video. The location 186*b* may be used to find recorded video that was captured at a particular location (e.g., at an intersection at a particular time). In some embodiments, the location 186*b* may comprise an absolute location of the objects 184*a*-184*n*. For example, the absolute location 186*b* may be determined by the video analysis performed by the capture devices 100*a*-100*n* to determine the actual coordinates of the objects detected instead of merely the GPS coordinates of the capture devices 100*a*-100*n*. In some embodiments, the location 186*b* may be the location of the object within the video frame (e.g., the distance of the object from the camera lens determined by the capture devices 100*a*-100*n* using video analysis).

The object information 186*c* may comprise a direction. In some embodiments, the direction 186*c* may indicate the direction of travel of the objects 184*a*-184*n* (or if the objects 184*a*-184*n* are stationary). For example, the direction 186*c* may be determined by the capture devices 100*a*-100*n* analyzing a sequence of video frames to determine where the object is moving over time. In some embodiments, the direction 186*c* may be the direction that the capture device 186*a*-186*n* was facing when the video data was captured. For example, the information from the location 186*b* and the direction 186*c* may be combined to determine the absolute location coordinates of the objects 184*a*-184*n*. Other types of metadata 186*n* may be stored about the objects 184*a*-184*n*. The types and/or amount of object information 186*a*-186*n* may be varied according to the design criteria of a particular implementation.

The information stored about the video clips 180a-180n may be used to identify vehicles, times, locations and/or other data about the recorded videos. The video clip metadata 180a-180n may be the data checked by the database 130 to determine results for a search query from the subscriber users. The video metadata 180a-180n may be used to approximate what may be recorded and/or visible when viewing the corresponding recorded video. The storage format for the metadata 158 may be implemented to enable re-enact and/or re-creating a scene (e.g., the vehicle locations) after the video data has expired (e.g., re-creating the arrangement of the objects when the video data is no longer available).

The circuits 102a-102n may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition). The circuits 102a-102n may be configured to determine roadway data in real time. In one example, the object information 186a-186n may store information corresponding to a type of vehicle detected (e.g., color of a car, make of a vehicle, model of a vehicle, year of a vehicle, speed of a vehicle, etc.). In another example, the object information 186a-186n may comprise roadway data (e.g., a lamp post detected, a street sign detected, a shape of a roadway detected, conditions of the road detected, etc.).

The database 130 may be configured to index the video metadata and/or associate new video metadata with license plate numbers and/or objects in real time. The database 130 may arrange the data to enable efficient filtering of information to provide fast search results for the subscriber users. In the example shown, the metadata 158 is arranged according to the video clips 180a-180n. In another example, the metadata 158 may be arranged based on a time, a location, a camera ID, etc.). The arrangement of the storage of the data in the database 130 may be varied according to the design criteria of a particular implementation.

The database 130 may be configured to create a database entry for each incoming video clip. In one example, the video metadata 182a-182n for the clip 180a may comprise information such as id="1", lp="5SAM333", date="20170307", time="14:30", alt="141.46354", lat="37.804440" and/or lng="−122.422874". In another example, the video metadata 182a-182n for the clip 180i may comprise information such as id="2", lp="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database may implement one file for each license plate 180a-180n to avoid parsing all stored data in order to filter out license plate results in real time.

Figure 3:
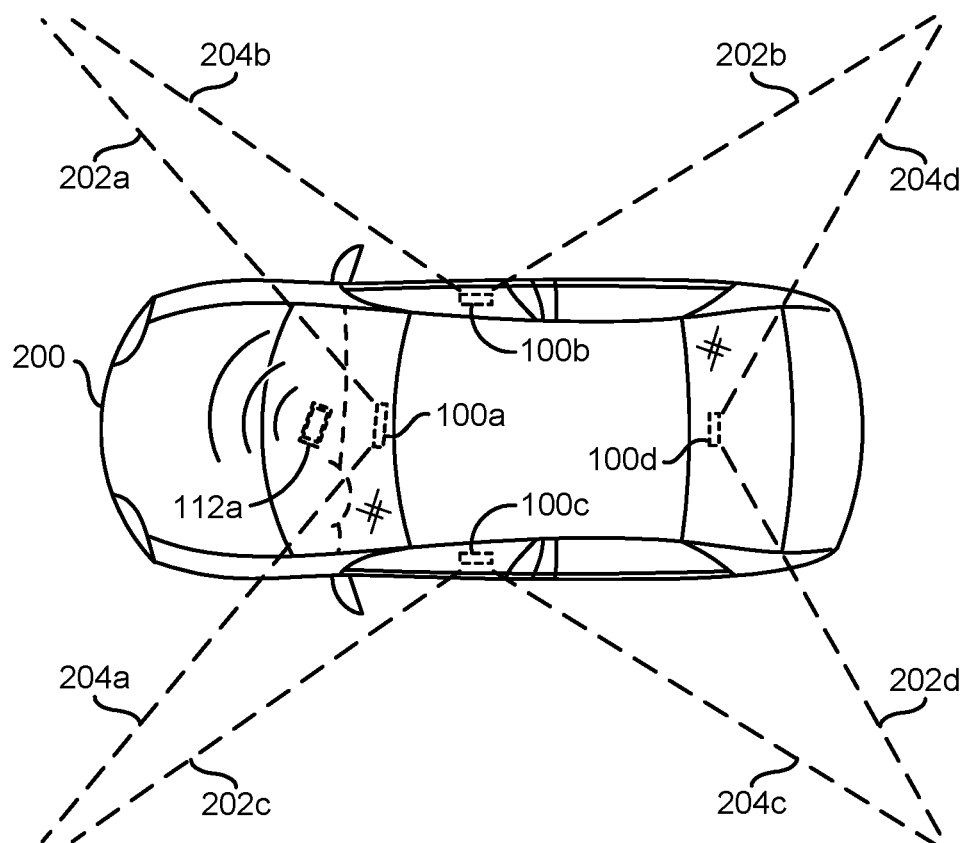
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 100a-100n. In the example shown, the capture device 100a may be installed facing the direction of travel of the vehicle 200, the capture device 100b may be installed directed away from a passenger side of the vehicle 200, the capture device 100c may be installed directed away from a driver side of the vehicle 200 and the capture device 100d may be installed directed facing opposite from the direction of travel of the vehicle 200.

The user communication device 112a is shown in the vehicle 200. In the example shown, the user communication device 112a may be a smartphone communicating to the network 60 (e.g., via a 3G/4G/LTE/5G wireless connection). For example, each of the installed cameras 100a-100d may communicate with the smartphone 112a (e.g., creating a local network) and the smartphone 112a may communicate with the external network 60. In the example shown, the capture devices 100a-100d may be positioned on the windows of the front, side and back of the vehicle 200 (e.g., suction cupped from the inside of the vehicle 200). The number, installation and/or locations of the capture devices 100a-100n in a vehicle may be varied according to the design criteria of a particular implementation and/or a preference of the data provider.

A line 202a and a line 204a are shown extending from the capture device 100a. The line 202a and the line 204a may represent a field of view captured by the capture device 100a. The field of view of the capture device 100a may record video of a view from the front of the vehicle 200 (e.g., from a perspective of a front of the vehicle 200). A line 202b and a line 204b are shown extending from the capture device 100b. The line 202b and the line 204b may represent a field of view captured by the capture device 100b. The field of view of the capture device 100b may record video of the view from the right of the vehicle 200 (e.g., from a perspective of a passenger side of the vehicle 200). A line 202c and a line 204c are shown extending from the capture device 100c. The line 202c and the line 204c may represent a field of view captured by the capture device 100c. The field of view of the capture device 100c may record video of the view from the left of the vehicle 200 (e.g., from a perspective of a driver side of the vehicle 200). A line 202d and a line 204d are shown extending from the capture device 100d. The line 202d and the line 204d may represent a field of view captured by the capture device 100d. The field of view of the capture device 100d may record video of the view from the rear of the vehicle 200 (e.g., from a perspective of a back of the vehicle 200).

The vehicle 200 may have a number of the capture devices 100a-100n installed. In the example shown, four of the capture devices 100a-100n may be installed. For example, the cameras may be directed for a "drive mode" (e.g., the camera 100a directed forward, and the camera 100d directed backwards) and the cameras may be directed for a "trawl mode" (e.g., the camera 100b and the camera 100c each directed sideways). For example, the trawl mode may be useful when in parking lots. The number of the capture devices 100a-100n installed on the vehicle 200 may be varied according to the design criteria of a particular implementation.

Figure 4:
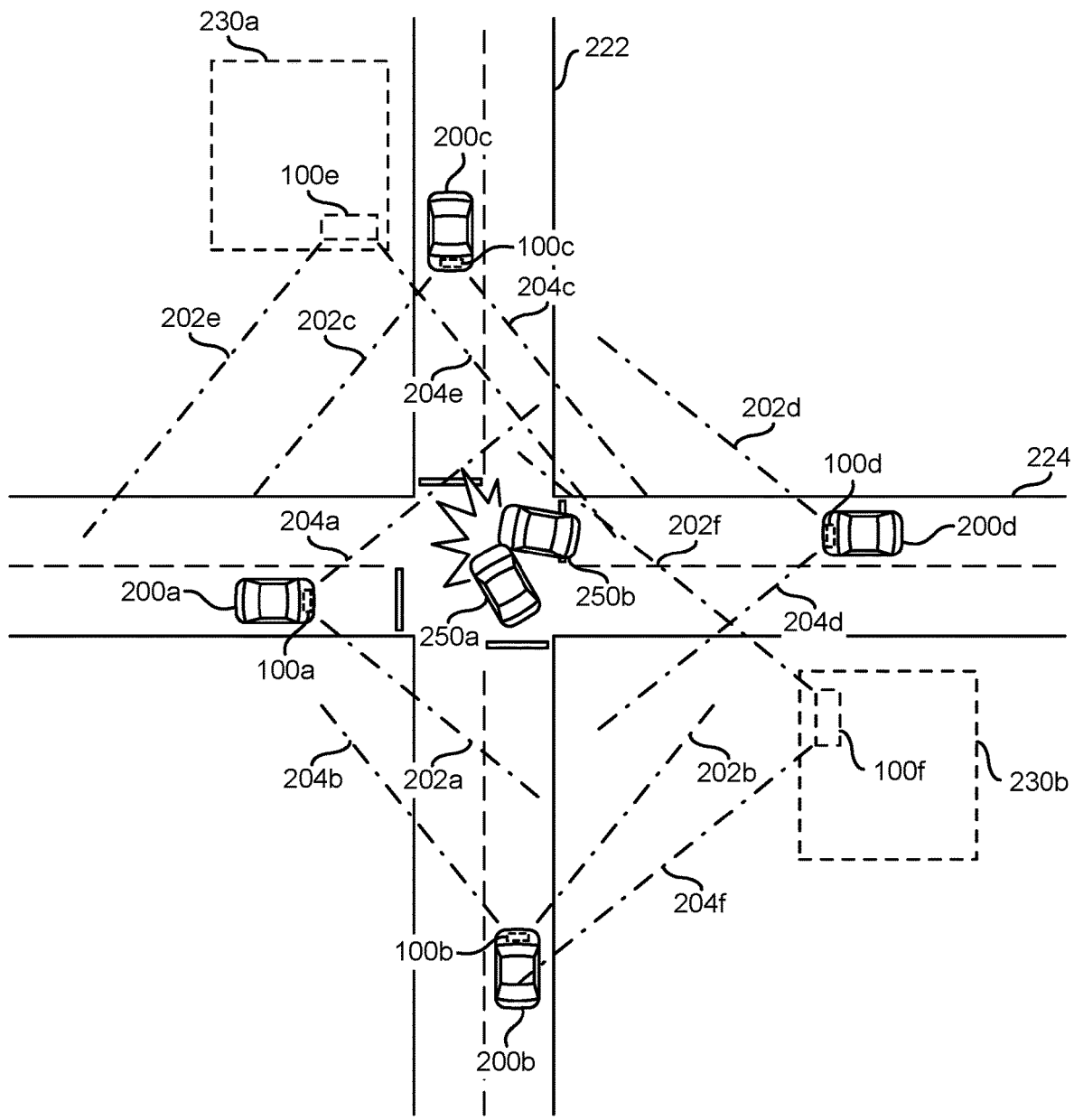
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 100a installed, the vehicle 200b may have the capture device 100b installed, the vehicle 200c may have the capture device 100c installed and/or the vehicle 200d may have the capture device 100d installed. The drivers of the vehicle 200a, the vehicle 200b, the vehicle 200c and/or the vehicle 200d may be data providers. A building 230a and a building 230b are shown. The building 230a may have the capture device 100e installed and the building 230b may have the capture device 100f installed as a security camera. In some embodiments, one or more of the capture devices 100a-100n may be implemented as stationary cameras. The owner of the building 230a and the owner of the building 230b may be data providers for the system 50 (e.g., capture video of the event 220).

The capture device 100a may capture one field of view (e.g., the line 202a and the line 204a) from the viewpoint of the vehicle 200a. The capture device 100b may capture one field of view (e.g., the line 202b and the line 204b) from the viewpoint of the vehicle 200b. The capture device 100c may capture one field of view (e.g., the line 202c and the line 204c) from the viewpoint of the vehicle 200c. The capture device 100d may capture one field of view (e.g., the line 202d and the line 204d) from the viewpoint of the vehicle 200d. The capture device 100e may capture one field of view (e.g., the line 202e and the line 204e) from the viewpoint of the building 230a. The capture device 100f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 100a-100f of the event 220. For example, the database 130 may receive six different user IDs of the data provider users. The database 130 may receive six slightly different GPS coordinates corresponding to the different locations of the cameras 100a-100f. In some embodiments, the database 130 may receive the same timestamp from each of the capture device 100a-100f. In some embodiments, the timestamp may be slightly different because the video files may be stored as video clips having a pre-determined time (e.g., 2 minute video clips) and the start and end time of each video clip may depend on when the cameras 100a-100f were booted up (e.g., when the vehicles 200a-200d were started). In some embodiments, system 50 may be configured to synchronize the time on each of the capture devices 100a-100n (e.g., to ensure the timestamp for a start and end time of each video clip matches between the capture devices 100a-100n). The database 130 may receive up to 6 different direction metadata information. In some embodiments, multiple clips 180a-180n with metadata information 182a-182n and/or object information 186a-186n for each object detected may be received (e.g., depending on the length of the event 220).

The video metadata from each of the cameras 100a-100f may be uploaded to the database 130. Since two vehicles (e.g., 250a-250b) are in the car accident, the database 130 may associate at least the objects 184a-184b with two license plates and/or vehicle type entries (e.g., 184a for the vehicle 250a and 184b for the vehicle 250b). Depending on the fields of view, some of the cameras 100a-100n may not capture both license plates and/or vehicles (e.g., the field of view of the camera 100b may capture the license plate of the vehicle 250a but not capture the license plate of the vehicle 250b). License plate entries may be made for the data provider vehicles 200a-200d (e.g., the capture device 100a may capture the license plate of the vehicle 200d). Additional license plate and/or vehicle entries may be made for other objects and/or vehicles captured (e.g., the capture device 100b may capture the colliding vehicles 250a-250b as well as the vehicle 200a).

The metadata 158 may be extracted from the video data captured by each of the capture devices 100a-100n. The video metadata 158 may be associated with the video clips 180a-180n corresponding to each field of view captured. In one example, the video clip 180a may correspond to the metadata associated with the video data captured by the capture device 100a. In another example, the video clip 180b may correspond to the metadata associated with the video data generated by the capture device 100b. In one example, the object 184a may correspond with the vehicle 250a captured by the capture device 100a and associated with the video clip 180a and the object 184b may correspond to the vehicle 250b captured by the capture device 100a and associated with the video clip 180a. In another example, the object 184a may correspond with the vehicle 250b captured by the capture device 100b and associated with the video clip 180b and the object 184b may correspond to the vehicle 250a captured by the capture device 100b and associated with the video clip 180b. The subscriber users may use the subscriber devices 110a-110n (e.g., via the app and/or web interface 114a) to search the metadata 184a-184n to view any videos that may have been captured of the event 220.

In some embodiments, the capture devices 100a-100n may implement Wi-Fi communication (e.g., to transmit the metadata and/or the recorded videos to the network 60). Implementing the Bluetooth communication to transfer data between the capture devices 100a-100n and the user communication devices 112a-112n may be useful in the vehicles (e.g., 200a-200d) to forward metadata and/or recorded videos to the network 60. In some embodiments, the capture devices 100a-100n may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 100a-100n could be placed to face out a window of a home and/or business (e.g., similar to a consumer IP camera). Connecting the capture devices 100a-100n to a Wi-Fi access point may enable the cameras 100a-100n to operate like a consumer IP Camera but additionally provide the video clip metadata 180a-180n (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 100a-100n in an existing fleet of vehicles and make a small profit over time by receiving payments from the system 50 by being a data provider (and use the video data like an ordinary dash camera for post-mortem analysis of any crash involving a vehicle from the fleet).

If the subscriber user (e.g., the driver of the vehicle 250a, the driver of the vehicle 250b, an insurance company representing the drivers of the vehicles 250a-250b, and/or another user) searches the video clips 180a-180n in the database 130, a list of videos of the event 220 may be provided. If the subscriber user decides to request a video recording of the event, the server 120 may send a request to one or more of the capture devices 100a-100n (or the associated user communication device 112a-112n). The circuits 102a-102n may set a flag for the requested video in response to the request from the server 120. Setting the flag for the requested video may be used to preserve the requested video recording (e.g., prevent the video from being over-written). The capture devices 100a-100n and/or the user communication devices 112a-112n may upload the video data to the server 120. In some embodiments, the associated video may be preserved for all data points that may be returned as search results of a search query. For example, the server 120 may send the request to one or more of the capture devices 100a-100n (or the associated user communication device 112a-112n) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 100a-100n that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 100a-100n in the vicinity may start preserving data. In one example, if the VIP event is happening presently, the video data being currently recorded may be preserved. In another example, the video data currently residing in the memory of the capture devices 100a-100n associated with the time of the event may be preserved (e.g., a crime is reported after the event occurs and later an interrupt request is provided to the capture devices 100a-100n to preserve potential evidence).

In some embodiments, the video metadata 182a-182b and/or the object information 186a-186n associated with each of the objects 184a-184n may enable the event 220 to be re-created, even if the video data is no longer available (e.g., expired, over-written, etc.). For example, the object information 186a-186n may be used for each of the objects 184a-184n of each of the video clips 180a-180n associated with the event 220 (e.g., based on a timestamp and/or general location) to determine the absolute location of each of the vehicles 200a-200d and/or the colliding vehicles 250a-250b. Even if the video data is no longer available, the object information 186a-186bn may provide detailed absolute coordinate information over a sequence of time. For example, the detailed absolute coordinate information may be used to indicate where each of the colliding vehicles 250a-250b were before, during and after the event 220. For example, by analyzing the absolute location coordinates over a sequence of time, the speed, direction of travel, the timing of the event 220 and/or other information about the colliding vehicles 250a-250b may be determined to re-create the event 220.

Figure 5:
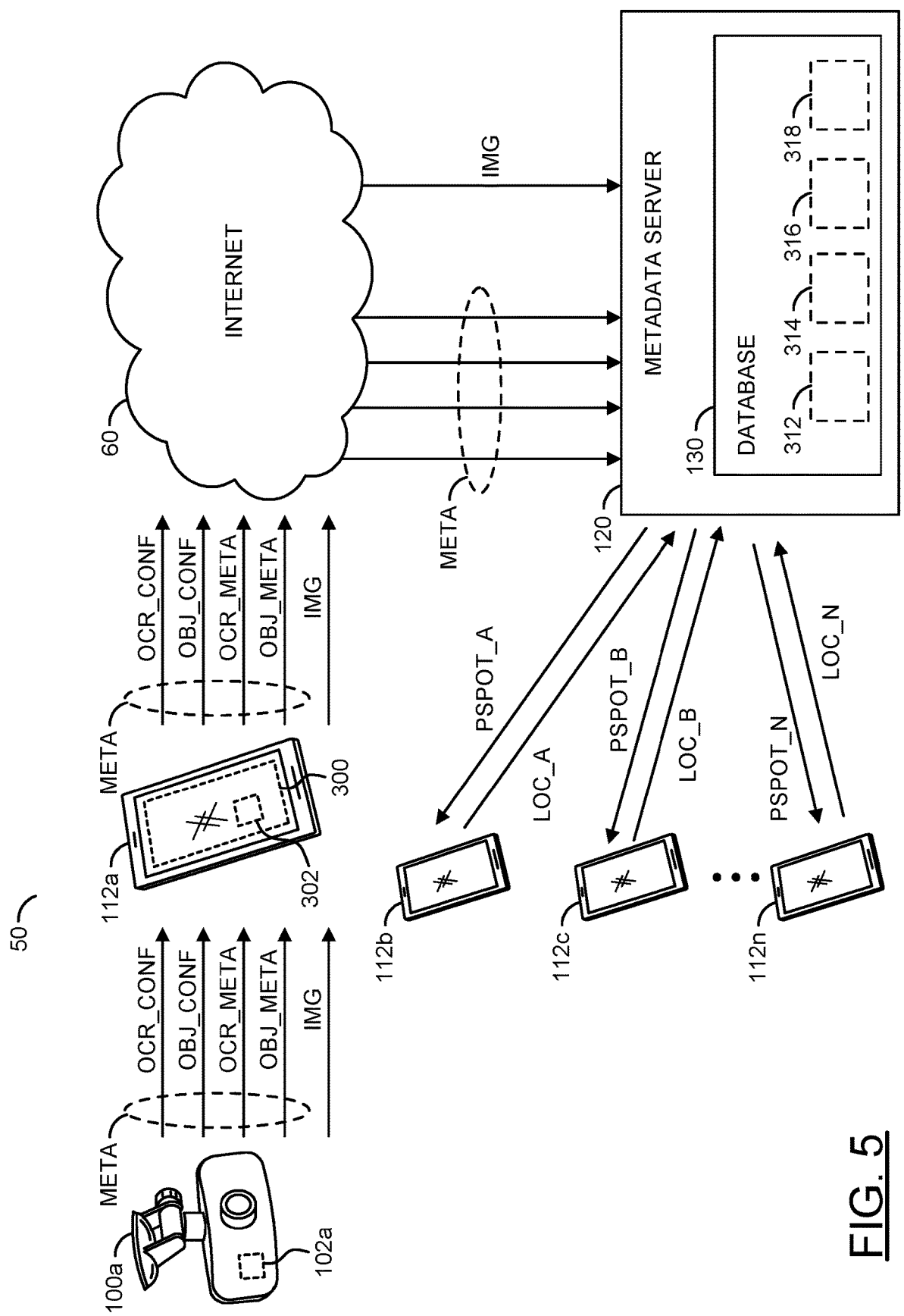
FIG. 5 is a diagram illustrating communication between a database, a capture device, and a wireless communication device.

Referring to FIG. 5, a diagram illustrating communication between the database 130, the capture device 100a, and one of the wireless communication devices 112a is shown. In the example shown, a portion of the system 50 comprising the capture device 100a, the user device 112a, the network 60, the server 120 and a number of the user devices 112b-112n are illustrated as a representative example. For example, the system 50 generally comprises multiple capture devices 100a-100n each configured to provide data to the server 120. A number of signals are shown being communicated between the components of the system 50. The number and/or types of data transmitted in each of the signals may be varied according to the design criteria of a particular implementation.

The video capture device 100a may be capturing video data and/or uploading metadata. The circuit 102a may be configured to communicate process, encode, store and/or perform video analytics on the captured video data. Results of the video analytics may be communicated as a signal (e.g., META). Data portions of the captured video data may be communicated as a signal (e.g., IMG). In an example, the signal META may comprise data that may be stored by the database 130 as the metadata 158. In an example, the signal IMG may be a still image of the captured video data that corresponds to the communicated metadata. In another example, the signal IMG (or other video frames) may not be communicated (e.g., no video frames are communicated). The capture device 100a is shown presenting the signal META and/or the signal IMG to the user device 112a. The capture device 100a may present and/or receive other signals (not shown). For example, the capture device 100a may be configured to communicate the video data.

The user device 112a is shown receiving the signal META and/or the signal IMG from the capture device 100a. The user device 112a is shown presenting the signal META and/or the signal IMG to the network 60. The user device 112a may present and/or receive other signals (not shown).

The network 60 is shown receiving the signal META and/or the signal IMG from the user device 112a. The network 60 is shown presenting the signal META and/or the signal IMG to the metadata server 120. The network 60 may present and/or receive other signals (not shown). In the example shown, the user device 112a and the network 60 may be used to forward the signal META from the capture device 100a to the metadata server 120.

The server 120 is shown receiving the signal META and/or the signal IMG from the network 60. The server 120 is shown receiving a number of signals (e.g., LOC_A-LOC_N) from the user devices 112b-112n. The server 120 is shown presenting a number of signals (e.g., PSPOT_A-PSPOT_N) to the user devices 112b-112n. The metadata server 120 may present and/or receive other signals (not shown). In the example shown, the signals PSPOT_A-PSPOT_N and/or the signals LOC_A-LOC_N are shown transmitted directly between the user devices 112b-112n and the server 120. However, the signals PSPOT_A-PSPOT_N and/or the signals LOC_A-LOC_N may be communicated through the network 60.

The user devices 112b-112n are each shown receiving one of the signals PSPOT_A-PSPOT_N from the metadata server 120. The user devices 112b-112n are each shown presenting one of the signals LOC_A-LOC_N to the metadata server 120. The user devices 112b-112n may present and/or receive other signals (not shown).

In the example shown, the user device 112a is shown presenting the signal META. However, the user device 112a may further receive one of the signals PSPOT_A-PSPOT_N and present one of the signals LOC_A-LOC_N. For example, a user may both send the metadata comprising information about locations of available and/or unavailable parking spaces and receive information about finding available parking spaces. Similarly, each of the user devices 112b-112n may be configured to communicate the signal META to the metadata server 120 (e.g., provide information about parking spaces captured in the video data).

The signal META may comprise information that may be stored as the metadata 158 (e.g., generated by the cameras 100a-100n in response to the video analysis) that may be stored and/or indexed in the database 130. The capture device 100a may implement a short-range, inexpensive and/or low power consumption communications protocol (e.g., Bluetooth) to communicate with the user device 112a. The user device 112a may forward the signal META and/or the signal IMG to the network 60. The network 60 may transmit the signal META and/or the signal IMG to the server 120 for storage in the database 130. In some embodiments, since the amount of data communicated in the signal META and/or the signal IMG may be relatively small (e.g., compared to a video file), the user device 112a may not need to wait until bandwidth and/or data usage restrictions are not in place to communicate with the network 60.

In the example shown, the signal META may comprise a signal (e.g., OCR_CONF), a signal (e.g., OBJ_CONF), a signal (e.g., OCR_META) and/or a signal (e.g., OBJ_META). The signal META may comprise other signal components (not shown). The signal OCR_CONF may represent a confidence level output corresponding to characters of any license plates or street sign detected in the captured video frames. The signal OBJ_CONF may represent a confidence level output corresponding to any objects detected in the captured video frames (e.g., roadway information). The signal OCR_META may represent metadata generated by the video analytics module of the circuit 102a in response to the video detection corresponding to license plates, street signs and/or other road markings with text. The signal OBJ_META may represent metadata generated by the video analytics module of the circuit 102a in response to the video detection corresponding to objects (e.g., roadway information, vehicles, pedestrians, parking spaces, etc.).

The circuits 102a-102n may be configured to generate the metadata (e.g., the signal OCR_META and/or the signal OBJ_META) associated with objects detected in the video frames captured by the cameras 100a-100n. The circuits 102a-102n may be further configured to provide a confidence level of the detection (e.g., OCR_CONF and/or OBJ_CONF). The confidence level may represent a likelihood that the metadata generated is correct. In an example, the signal OBJ_CONF may indicate a confidence level that a parking space was detected and/or a confidence level of the determination made by the circuits 102a-102n that the parking space is available or unavailable.

In one example, if all characters of a license plate are readable, the confidence level of the OCR performed may be high. In another example, if one or more characters are obscured or appear similar to another character, the confidence level of the OCR performed may be low. In yet another example, if one of the characters is obscured, but the obscured character is clearly detectable in a previous video frame, the confidence level of the OCR performed may be high (e.g., the circuits 102a-102n may use detections from previous video frames to infer results in a later video frame). Similarly, for objects detected, if a vehicle make/model is determined, the confidence level may be high. In another example, if a vehicle looks like another vehicle make/model, the confidence level may be low. In some embodiments, there may be a confidence level for each object and/or each character of each object (e.g., a high granularity of detection). In one example, each license plate that is detected may have a confidence level for each character on the license plate. In another example, each vehicle detected may have a confidence level associated for the color of the vehicle, the year of the vehicle, the make of the vehicle, the model of the vehicle, etc.

License Plate Recognition (LPR) systems and/or sign recognition systems may employ Optical Character Recognition (OCR) technology to read individual characters of the license plate tags and/or roadway signs. The characters may represent a combination of alpha-numeric characters along with any special shapes available by the state and chosen by the individual for vanity plates such as stars, hearts, smiley faces, etc. LPR systems may not be perfect and a variety of factors may cause imperfect scans including dirty, bent, and/or damaged plates or non-ideal capture environments such as rainy, snowy, dark and foggy climate conditions. Similar factors may affect object recognition.

The circuits 102a-102n may be configured to generate the signal OCR_CONF as a confidence level as part of the OCR results to give an idea of the trustworthiness of the information returned. Similarly, the circuits 102a-102n may be configured to generate the signal OBJ_CONF as a confidence level as part of the object detection results to give an idea of the trustworthiness of the information returned. In one example, the confidence level may be provided as a percentage (e.g., 100% confidence, 50% confidence, 25% confidence, etc.). In another example, the confidence level may be provided as a fuzzy logic category (e.g., high confidence, low confidence, no confidence, etc.). In yet another example, the confidence level may be provided as a binary result (e.g., confident or not confident). The type of confidence result provided by the circuits 102a-102n may be varied according to the design criteria of a particular implementation.

The signal IMG may be a data portion of the captured video data. The camera 100a may communicate the signal IMG and the system 50 may transfer the signal IMG to the metadata server 120. The metadata server 120 may be configured to store and/or convert the data portion IMG. In one example, the data portion may be an image (e.g., a JPEG file) and the server 120 may convert text detected in the image to a text format. In another example, the data portion may be an image and the image may be presented to the user devices 112b-112n as part of the signals PSPOT_A-PSPOT_N (e.g., provide visual evidence of an available parking space, or visual evidence that a parking space is occupied). In yet another example, the data portion may be a video clip. In still another example, the CPU 122 may be configured to receive feedback about whether the object analysis has been performed correctly in order to improve the video analytics performed (e.g., provide feedback for machine learning).

The signals LOC_A-LOC_N may comprise information used by the parking spot detection and/or recommendation aspect of the system 50. In an example, the signals LOC_A-LOC_N may comprise a current location of the vehicles 200a-200n. In another example, the signals LOC_A-LOC_N may comprise a requested location for parking the vehicles 200a-200n. The system 50 may use the current location of the vehicles 200a-200n in order to recommend a parking space nearby. For example, a parking user (e.g., a user in search of a parking space) may send a request to the system 50 for a recommendation of an available parking space. The signal LOC_A-LOC_N may comprise the request and/or a desired location for the parking space. In an example, the parking user may be searching for a parking space and send the request using the signal LOC_A-LOC_N in order to find a nearby available parking space (e.g., the current location of the vehicles 200a-200n may be sent with the signal LOC_A-LOC_N). In another example, the parking user may be planning a trip (or errand) and may send the request using the signal LOC_A-LOC_N in order to find an available parking space at a particular destination (e.g., the location of a destination may be sent with the signal LOC_A-LOC_N before the vehicles 200a-200n reaches the desired destination).

The signals PSPOT_A-PSPOT_N may comprise information about available parking spaces used by the parking spot recommendation aspect of the system 50. The system 50 (e.g., the CPU 122 of the metadata server 120) may be configured to receive and/or analyze the metadata 158 to determine which parking spaces are available and/or unavailable. In response to the request for a parking space (e.g., the signals LOC_A-LOC_N), the system 50 may determine available parking spaces near the requested location. The signals PSPOT_A-PSPOT_N may comprise information about the available and/or unavailable parking spaces near the requested location. In one example, the signals PSPOT_A-PSPOT_N may comprise information compatible with various systems of the vehicles 200a-200n (e.g., infotainment systems, the camera systems 100a-100n, an audio system, a GPS navigation system, etc.). The signals PSPOT_A-PSPOT_N may be configured to interact with the systems of the vehicle 200a-200n to provide directions to an available parking space. In one example, the signals PSPOT_A-PSPOT_N may comprise turn-by-turn directions for the vehicles 200a-200n. In some embodiments, the signals PSPOT_A-PSPOT_N may comprise historical information about the availability of parking spaces near the area of the request. The type of information provided in the signals PSPOT_A-PSPOT_N may be varied according to the design criteria of a particular implementation.

In some embodiments, the signal LOC_A-LOC_N may be provided to the metadata server 120 comprising information about a parking space currently occupied by one of the vehicles 200a-200n. The signal LOC_A-LOC_N may indicate that one of the vehicles 200a-200n is in a parking space and the location of the parking space occupied by one of the vehicles 200a-200n. By providing the information about the vehicles 200a-200n that are currently in a parking spot, the metadata server 120 may enable requests to temporarily hold parking spaces.

In some embodiments, the signal PSPOT_A-PSPOT_N may comprise a request to a user that is already parked. In an example, a parking user may request a parking space via the signal LOC_A-LOC_N. The system 50 may determine that another user is parked in a location nearby. The metadata server 120 may generate one of the signals PSPOT_A-PSPOT_N to the parked user with a request to temporarily hold the parking spot for the user requesting the parking spot. If the parked user accepts the request to hold the parking spot, the metadata server 120 may generate one of the signals PSPOT_A-PSPOT_N to provide the directions to the temporarily held parking space to the user that requested the parking space.

The database 130 is shown comprising a block (or circuit or module) 312, a block (or circuit or module) 314, a block (or circuit or module) 316 and/or a block (or circuit or module) 318. The block 312 may implement a confidence level module. The block 314 may implement a historical data module. The block 316 may implement a feedback and update module. The block 318 may implement a user storage module. The database 130 may comprise other components (not shown). The number, type and/or arrangement of the module 312-318 may be varied according to the design criteria of a particular implementation.

The confidence level module 312 may be configured to store and/or analyze the confidence levels. For example, the confidence levels may be the data received in the signal OCR_CONF and/or the signal OBJ_CONF. The confidence level module 312 may be part of the metadata 158. Which parking spaces to request to the users may be based on the confidence levels stored and/or analyzed by the confidence level module 312.

The historical data module 314 may be configured to store, generate and/or track statistics about the availability of parking spaces over time. The signal META may comprise metadata about parking spaces from multiple of the camera systems 100a-100n that may capture the parking space at different times of the day and/or days of the week. The parking space may become available or unavailable at different times. Based on the continual flow of information about each parking space, the CPU 122 of the metadata server 120 may be configured to determine trends and/or detect patterns about when particular parking spaces are available. The trends and/or patterns may be stored by the historical data module 314.

The feedback and update module 316 may be configured to analyze the responses received from the users (e.g., feedback about the recommended parking spaces). The feedback and update module 316 may store and/or aggregate the information from the feedback. Some of the feedback may be discarded (e.g., outlier answers). The feedback and update module 316 may be configured to apply weighting (e.g., statistical significance) to the feedback based on the user that provided the feedback (e.g., trusted users may have more statistical weight than untrusted users). The feedback and update module 316 may be configured to interpret the feedback and provide updates to the object and/or character detection analysis performed. In some embodiments, the database 130 may provide the update determined by the feedback and update module 316 to each of the circuits 102a-102n to improve the object/character recognition performed. In an example, if a user is directed to an occupied parking space because the circuits 102a-102n were unable to correctly detect that the parking space was occupied, then the user may provide negative feedback about the object detection. In another example, if a user is directed to a parking space at an incorrect location, then the user may provide negative feedback. In yet another example, if the user is directed to a parking space that is available and in the location desired, the user may provide positive feedback. In another example, if the circuits 102a-102n correctly detected an available parking space, but the space was eventually taken by someone else, the feedback and update module 316 may update the historical data module 314. The feedback and update module 316 may use the feedback to continually improve the detection of available parking spaces and/or the recommendations provided to users.

The user storage module 318 may be configured to store gamification statistics about each user. The user storage module 318 may store information about which users have accepted requests to temporarily hold parking spots for other users. The user storage module 318 may store information about users that requested a parking space be held (e.g., how long it took for them to arrive, whether they made a request but failed to show up, etc.). The user storage module 318 may be configured to generate a user trust score for each user (e.g., whether a user consistently holds parking spaces, whether the user does not wait the requested amount of time, whether the user agrees to hold parking spot but fails to do so, etc.). The user storage module 318 may be used to blacklist a particular user with a low trust rating (e.g., a particular user may be determined to be intentionally trolling the system by accepting requests and failing to hold the space, or by making requests and intentionally not showing up). The user storage module 318 may be configured to determine the amount of statistical weight to provide to the responses of each user. The user storage module 318 may be configured to generate leaderboards and/or compile rankings for the users to encourage a strong community for finding parking spaces. The user storage module 318 may be configured to update and/or store information in the user profiles 170a-170n.

The system 50 may be configured to help the users 170a-170n to find parking spaces. The information in the signal META captured by one of the users 170a-170n may be relayed back to another one of the users 170a-170n that is searching for a parking space. The driver (e.g., the user 170a) of one of the vehicles (e.g., the vehicle 200a) with the camera system 100a installed may take part in capturing the metadata 158 to assist other users 170b-170n in other vehicles 200b-200n in finding a parking space. For example, a driver searching for a parking space (e.g., the user 170b) of the vehicle 200b may be a single occupant and may have difficulty safely piloting the vehicle 200b while looking for parking spaces (e.g., finding an open spot and identify if the parking space is legally available). The driver 170b of the vehicle 200b searching for a spot may not want to look at the user device 112b (e.g., a smartphone) or use some other distracting method to find free parking spaces. The system 50 may enable the user 170b to be directed to an available parking space based on the video captured by the camera system 100a of the user 170a (and the other users 170c-170n) so as to not to compromise the safety of the user 170b, the vehicle 200b or roadway property or pedestrians through distracted driving.

The system 50 may be configured to enable crowd sourced real-time parking space detection and notification. Detections made by one user at one location (e.g., the metadata generated by a scanning user) may be used to recommend a parking space to another user that is currently at a different location (e.g., a parking user). Recommendations for parking spaces may provide locations of available parking spaces that may not yet be visible to a parking user at a current location. The metadata 158 may be uploaded to the metadata server 120 without also providing the video data. While video data may be uploaded for other services provided by the system 50, the CPU 122 of the metadata server 120 may determine and/or recommend available parking spaces based on the metadata 158 alone. By not sending the video data with the signal META, the system 50 may conserve bandwidth (which may reduce wireless fees for the users) and reduce the amount of storage needed by the metadata server 120 (e.g., storing text-based metadata information has significantly less data than storing video data). The metadata 158 may provide the CPU 122 information about what was in the video captured without providing the video file.

Figure 6:
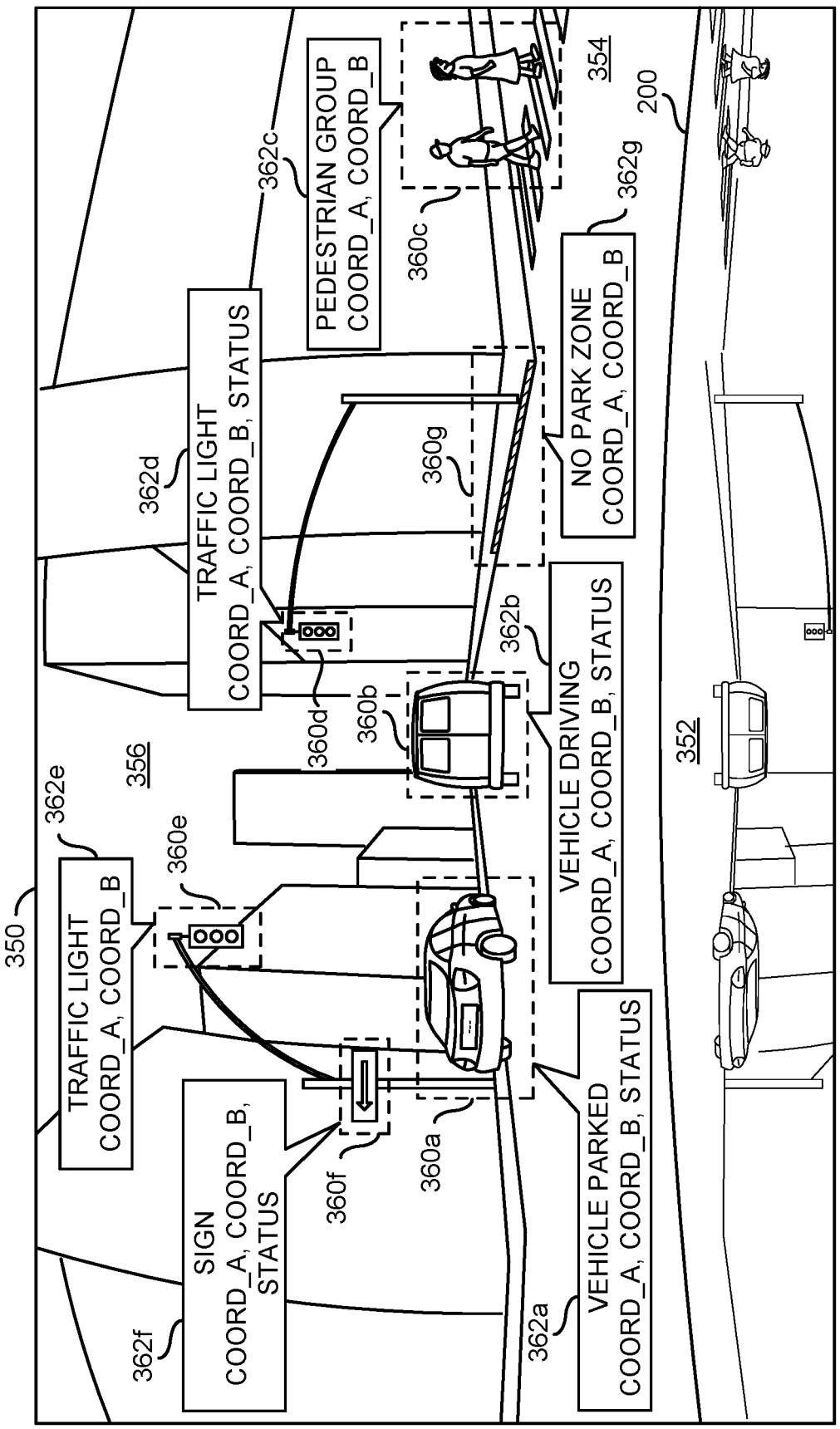
FIG. 6 is a diagram illustrating an example video frame captured by the camera detecting potential parking spaces while the vehicle is driving.

Referring to FIG. 6, a diagram illustrating an example video frame captured by the camera detecting potential parking spaces while the vehicle is driving is shown. An example video frame 350 is shown. The example video frame 350 may be an example of a video frame captured by and/or stored by one of the capture devices 100a-100n and/or uploaded to the database 130 (e.g., the signal IMG). In the example shown, the video frame 350 may comprise a captured view of an urban area.

The vehicle 200 is shown in the example video frame 350. For example, one of the capture devices 100a-100n (e.g., 100a) may be a dash-mounted camera located within the vehicle 200 directed towards the windshield of the vehicle 200. The portion of the vehicle 200 shown may be a hood 352. Generally, the dashcam 100a may be mounted in a static position with respect to the vehicle 200. Since the location of the dashcam 100a may not move (or may have minimal movement) with respect to the vehicle 200, the hood 352 may be located in the same space of each captured video frame. In some embodiments, the capture devices 100a-100n may be movable (e.g., may be rotated, tilted and/or panned manually or automatically). In some embodiments, the vehicle 200 may comprise more than one of the capture devices 100a-100n (e.g., capture a front view, a rear view and/or side views). Regardless of the location and/or content of the captured video frame 350, the processors 102a-102n may perform similar operations to analyze the video frame 350 and/or generate the metadata META.

The example video frame 350 may comprise the hood 352, a middle section 354 and an upper section 356. The hood 352 may be located at a bottom edge of the video frame 350. Generally, the middle section 354 may comprise roadway. Generally, the upper section 356 may comprise the sky and buildings.

Various objects 360a-360g are shown in the example video frame 350. The various objects 360a-360g may be detected by a video analysis module implemented by the circuits 102a-102n. As an illustrative example, boxes are shown around the detected/recognized objects 360a-360g. In the example shown, the object 360a may be a vehicle (e.g., parked on the side of the road), the object 360b may be a vehicle (e.g., a utility van), the object 360c may be a group of pedestrians, the objects 360d-360e may be stop lights, the object 360f may be a road sign (e.g., a one-way sign) and the object 360g may be a painted curb (e.g., a no parking zone detected based on curb color). Other objects may be detected such as curbs, street markings, buildings, billboards, lampposts, sidewalks, lane markers, available parking spaces, etc. The number and/or type of objects detected by the video analysis performed by the circuits 102a-102n may be varied according to the design criteria of a particular implementation.

Status captions 362a-362g are shown. The status captions 362a-362g may be associated with the detected objects 360a-360g. The status captions 362a-362g may represent some of the information that may be tagged for the detected objects 360a-360g in response to the video analysis performed by the circuits 102a-102n. In the example shown, the status caption 362a may indicate that the object 360a has been identified as a parked vehicle, is located at a particular coordinate in the video frame 350 (e.g., an X coordinate and a Y coordinate location) and/or status information about the detected object 360a may be stored (e.g., make/model of vehicle, whether the object is moving or parked, color, size, license plate number, presence of decorations such as bumper stickers and/or truck nuts, etc.). In another example, for the detected object 360e, the object may be detected as a traffic light and the status may indicate that the light is green. In yet another example, for the detected object 360f, the object may be detected as a street sign and the status may indicate that the sign is a one-way street sign. Generally, the information in the status captions 362a-362g may correspond to the information stored that may eventually be stored in the metadata 158 when uploaded as the signal META.

In the example shown, the detected object 360g may be detected as a no parking zone. The no parking zone object 360g may comprise a painted curb. The circuits 102a-102n may be configured to identify various indicators that a location is a no parking zone. In one example, if one of the objects 360a-360g was determined to be a fire hydrant, then the circuits 102a-102n may identify the location corresponding to the fire hydrant as a no parking zone. In another example, if one of the objects 360a-360g was determined to be a portion of road and/or sidewalk with a sign or painted text (e.g., determined using the OCR analysis) comprising words that indicate no parking is allowed (e.g., the text "no parking"), then the circuits 102a-102n may identify the location corresponding to the text as a no parking zone. For example, handicap parking symbols painted on asphalt or on signs may be used as indicators that parking may not be allowed and/or may not be appropriate for the particular user (e.g., the metadata server 120 may comprise information indicating whether the user has a permit to park in spaces intended for handicap use). In yet another example, the circuits 102a-102n may detect objects that indicate no parking is allowed based on various local rules and/or conventions. For example, if the painted curb 360g is painted red then a local convention may indicate that no parking is allowed at the location. In another example, if the painted curb 360g is painted blue, the circuits 102a-102n may determine that the painted curb 360g may be reserved for disabled parking (e.g., parking allowed only if appropriate credentials are available). In yet another example, if the painted curb 360g is painted another color, the circuits 102a-102n may determine that the painted curb may be decorative and not indicate that no parking is allowed. In yet another example, the rule and/or convention may be a distance from an intersection (e.g., the object 360a may be far enough from the intersection to be considered to be in a legal parking space, however, if the vehicle 360a were on the other side of the sign 360f the vehicle 360a may be too close to the intersection to be in a legal parking space). The types of objects detected that may indicate no parking is allowed may be varied according to the design criteria of a particular implementation.

The circuits 102a-102n may be configured to parse various word combinations as indication that no parking may be allowed. In an example the combinations of words may comprise "no parking", "fire zone", "no standing", "keep area clear", "deliveries only", etc. The circuits 102a-102n may be configured to analyze street signs and/or text on street signs. For example, street signs may comprise text indicating which times of day, days of the week, and/or months of the year that parking on the road may be permitted (no parking from 8 am-6 pm, no parking from Mon-Fri but parking is permitted Sat-Sun, parking on one side of the street on alternating months, etc.). The circuits 102a-102n may be configured to OCR the text on the sign, parse the detected text, and interpret the meaning of the text to determine whether a parking spot is present at the particular location. In some embodiments, the circuits 102a-102n may be configured to determine an association between multiple signs. For example, one sign may indicate one boundary for street parking (e.g., no parking beyond a particular location on the street) and another sign may indicate another boundary for street parking, but by analyzing both signs together, the circuits 102a-102n may infer that the locations between the two signs may be legal parking spaces.

In some embodiments, the location in the status captions 362a-362g may be a GPS location. In one example, the GPS location may be acquired by the circuits 102a-102n (e.g., a GPS module implemented by the circuits 102a-102n). In another example, the GPS location may be acquired from the user device 112a (e.g., the smartphone 112a may comprise a GPS module and provide the location to the camera 100a and/or the smartphone 112a may add to the metadata before uploading). In yet another example, the GPS location may be received from an OBD device of the vehicle 200 capable of determining GPS coordinates. In some embodiments, the camera 100a may be configured to determine more granular location coordinates based on the location of the camera 100a that captured the video frame 350 and using video analysis to determine distances to the detected objects 360a-360g as described in U.S. patent application Ser. No. 16/106,777, filed Aug. 21, 2018, appropriate portions of which are hereby incorporated by reference.

Generally, the status captions 362a-362g and/or the boxes shown around the detected objects 360a-360g may not appear in the example video frame 350 when stored as a recording (e.g., when played back using a playback device). The boxes around the detected objects 360a-360g and/or the status captions 362a-362g may be illustrative examples indicating the types of objects detected by the video analysis module performed by the circuits 102a-102n and/or the type of information stored as the metadata 158. In some embodiments, for testing purposes (e.g., in a debug mode), the boxes around the objects 360a-360g and/or the status captions 362a-362g may be shown overlaid on the video data IMG.

In some embodiments, the cameras 100a-100n may be configured to generate automated incident reports. In one example, the circuits 102a-102n may be configured to flag an event (e.g., a collision such as the collision between the vehicle 250a-250b as shown in association with FIG. 4). In another example, the driver may manually flag an event by providing an input to the camera 100a (e.g., by pressing a button on the camera 100a and/or using the smartphone 112a connected to the camera 100a). In yet another example, the user may manually flag a location that has incorrectly been identified as a parking space by the circuits 102a-102n. In response to flagging the event, the cameras 100a may preserve the corresponding one of the video files (e.g., including a pre-determined amount of time before and after the event, such as 30 seconds before and 30 seconds after). The camera 100a (e.g., via the smartphone 112a) may communicate the video file associated with the event and the metadata (e.g., including sensor data from the vehicle 200 and/or the camera 100a) to the metadata server 120. The metadata server 120 may use the flagged event (e.g., an incorrectly identified parking spot) to update a feature set used by the circuits 102a-102n to continually improve the video analysis performed.

In some embodiments, the metadata server 120 may overlay the metadata 158 on the video corresponding to the event. In some embodiments, the circuits 102a-102n may be configured to overlay the metadata on the video corresponding to the event before communicating the video file to the metadata server 120. The data overlay may be similar to the status captions 362a-362g. For example, the overlayed metadata may provide annotated proof using video data. The metadata overlayed on the video and/or image may comprise a location and/or timestamp. In an example, the annotated video frame may be used as evidence if one of the users receives a parking ticket. The annotated video frame may indicate the location and time of day that the vehicles 200a-200n were parked, which may indicate that the vehicles 200a-200n were legally parked. The annotated data of the status captions 362a-362g may provide additional information to insurance investigators and/or police to see the status of the traffic light 360e, license plates and/or make/model of the vehicle 360a, determine an identity of the pedestrians 360c (e.g., potential witnesses), etc. In an example, the camera 100a may be configured to generate a file (e.g., a PDF file) as the incident report that may reside in the memory of the camera 100a (e.g., an expandable SD-type card slot) and/or be downloaded to the user device 112*a*) to enable the incident report to be communicated later when internet connectivity is available.

In some embodiments, the image and/or video analysis may be performed by the circuits 102*a*-102*n* (e.g., on-camera). The circuits 102*a*-102*n* may comprise various components (e.g., a video processor, a memory, a location module, a wireless communications module, video analytics modules with feature set libraries, etc.). The hardware of the circuits 102*a*-102*n* may enable the video analysis to be performed on the edge devices 100*a*-100*n*. Details of the components of the circuits 102*a*-102*n* may be described in association with U.S. patent application Ser. No. 16/156,254, filed on Oct. 10, 2018, appropriate portions of which are hereby incorporated by reference.

In some embodiments, general statistics may be collected from each of the cameras 100*a*-100*n* in the system 50 and/or by the circuits 102*a*-102*n*. The statistics may be tracked and analyzed to learn and/or understand how many parking spots are available, how many parking spots are unavailable, which vehicles are typically parked in particular parking spots, etc. for each time period and general location. The statistics may be uploaded to the historical data module 314 of the database 130.

The historical data module 314 may collect statistics about individual parking spaces and/or multiple spaces at a particular location. In an example, based on the signal META generated in response to the detected objects 360*a*-360*g* and/or the status captions 362*a*-362*g*, uploaded from the camera systems 100*a*-100*n*, the historical data module 314 may determine that a particular curb location is usually occupied by a vehicle at a given time of day and day of week. If the parking spot that is usually occupied is now detected as being vehicle free and unoccupied the metadata server 120 may implement one heuristic that there may be a parking spot now available for use. The type of vehicle usually occupying an individual location at a particular time of day and during a particular day of week may be another indicator of a free parking space. In another example, the historical data module 314 may be used to determine that a particular location may be reserved for delivery or used exclusively for emergency vehicles. Similarly, the color of the curb detected using the video analytics may be an indicator of a local regulation as to when and what type of parking is available at a particular location. Parking signs and/or meters may be able to be identified and OCR may be performed for further information about available parking spaces. Generally, with enough historical data points collected by the camera 100*a*-100*n*, the historical data module 314 may determine statistics for historical parking availability pertaining to the number of occupied and unoccupied spaces for any given time of day or day of week.

In some embodiments, the database 130 may comprise information about the various users that may indicate whether a parking space is available and/or appropriate to use. For example, the database 130 may determine a reserved status for a parking space. The reserved status may comprise a disabled parking space, a reserved space (e.g., for a doctor, for a business owner, for a CEO, etc.), a delivery only area, etc. In some embodiments, the reserved status may be determined based on the historical data. For example, if the same vehicle regularly parks or is the only car that parks in a particular parking space, then the metadata server 120 may determine that the parking space is reserved. In one example, the user profiles 156 may comprise whether the user has a handicap parking permit. In another example, the user profiles 156 may comprise credentials for reserved parking (e.g., a business owner may have access to a reserved parking space while other people may not). In yet another example, the user profiles 156 may comprise credentials for residential parking (e.g., the user may have to pay the city/municipality a fee to have access to street parking in some areas). The circuits 102*a*-102*n* and/or the metadata server 120 may compare the credentials of the user with any credentials that may be associated and/or detected at a particular parking spot. For example, if the video analytics indicates that the parking spot is reserved for handicap use, the metadata server 120 may compare the credentials of the user to the detected handicap symbol in the metadata to determine whether the particular user is allowed to park in the space.

Figure 7:
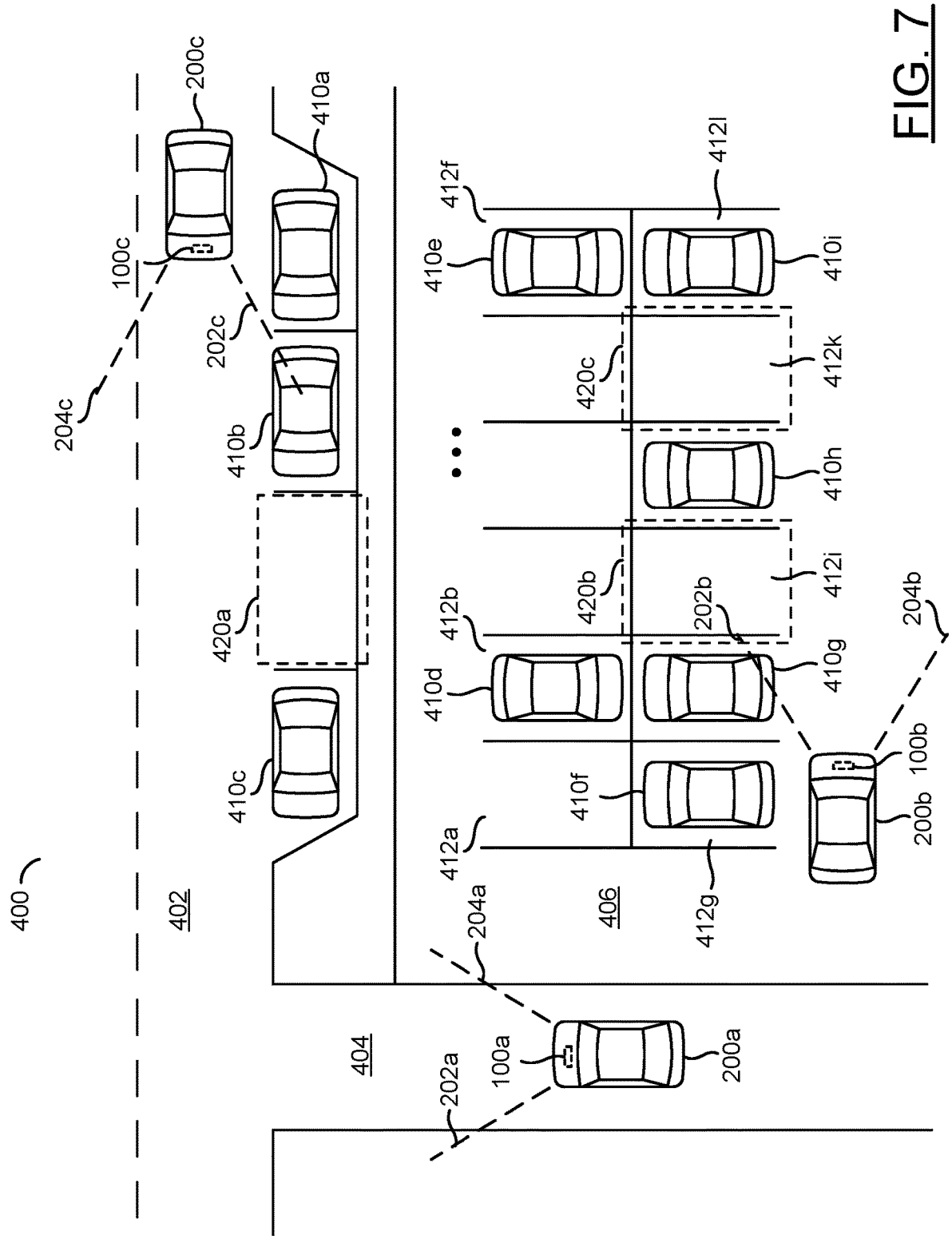
FIG. 7 is a diagram illustrating a scanning vehicle detecting available parking spaces.

Referring to FIG. 7, a diagram illustrating a scanning vehicle detecting available parking spaces is shown. An overhead view of a location 400 is shown. The location 400 may comprise a road 402, a road 404 and/or a parking lot 406. The overhead view of the location 400 may provide a representative example of the vehicles 200*a*-200*n* implementing the camera systems 100*a*-100*n* to search for available parking spaces.

The vehicle 200*a* is shown driving on the road 404. The vehicle 200*a* may comprise the camera system 100*a* and capture video data for analysis in the field of view 202*a*-204*a*. The vehicle 200*b* is shown driving in the parking lot 406. The parking lot 406 may be a scanning location of the vehicle 200*b*. The vehicle 200*b* may comprise the camera system 100*b* and capture video data for analysis in the field of view 202*b*-204*b*. The vehicle 200*c* is shown driving on the road 402. The location on the road of the vehicle 200*c* may be the scanning location of the vehicle 200*c*. The vehicle 200*c* may comprise the camera system 100*c* and capture video data for analysis in the field of view 202*c*-204*c*. In the example shown, the parking lot 406 may be a top floor of a parking garage (e.g., the field of view 202*a*-204*a* of the vehicle 200*a* may be at ground level and may not be able to see the top floor of the parking garage to analyze the parking lot 406).

In the example shown, the vehicle 200*a* may be a parking vehicle (e.g., a vehicle with a user searching for and/or requesting a parking spot). For example, the camera system 100*a* may communicate the signal LOC_A to provide the metadata server 120*a* the location of the vehicle 200*a*. The metadata server 120*a* may attempt to find an available parking space near the vehicle 200*a*. Even though the vehicle 200*a* may be requesting a parking space, the camera system 100*a* may still analyze the video data captured to detect parking spots (e.g., the vehicle 200*a* may be a scanning vehicle while also being a parking vehicle).

In the example shown, the vehicles 200*b*-200*c* may each be a scanning vehicle (e.g., a vehicle that is driving without an intent to park nearby). For example, the camera systems 100*b*-100*c* may communicate the signal META to the metadata server 120 to provide information about the location of occupied and/or unoccupied parking spaces detected. The metadata server 120 may be configured to generate the signal PSPOT_A to the camera system 100*a* comprising a location of an available parking spot in response to the metadata uploaded by the camera system 100*b*-100*c*.

The vehicle 200*c* is shown driving on the road 402. While the vehicle 200*c* is driving, the vehicle 200*c* may pass by the vehicles 410*a*-410*c* parked on the side of the road 402. The video analytics performed by the circuit 102*c*. The video analytics may detect the vehicles 410*a*-410*c* and an empty parking space 420*a*. In response to the video analytics, metadata may be generated by the circuit 102*c* indicating that four parking spaces are on the side of the road 402. The circuit 102c may determine that three of the spaces are occupied by the vehicles 410a-410c and the parking space 420a is an available parking space.

The available parking space 420a may be detected by the vehicle 200c. The vehicle 200c of the scanning user may be at a different location (e.g., the scanning location) than the vehicle 200a of the parking user (e.g., the current location). The available parking space 420a may not be visible to the camera system 100a of the vehicle 200a. The metadata server 120 may present the signal PSPOT_A comprising a location of the available parking space 420a to the camera system 100a to inform the driver of the vehicle 200a of a potential parking space (e.g., a parking space that would not be visible to the driver of the vehicle 200a).

The vehicle 200b is shown driving in the parking lot 406. While the vehicle 200b is driving, the vehicle 200b may pass by the parking spaces 412a-412l in the parking lot 406. Some of the parking spaces 412a-412l may be available and some of the parking spaces 412a-412l may be occupied by the vehicles 410d-410i. In the example shown, the vehicle 410d may occupy the parking space 412b, the vehicle 410e may occupy the parking space 412f, the vehicle 410f may occupy the parking space 412g, the vehicle 410g may occupy the parking space 412h, the vehicle 410h may occupy the parking space 412j, the vehicle 410i may occupy the parking space 412l and the parking spaces 412a, 412c-412e, 412i and 412k may be empty parking spaces.

The camera system 100b may perform the video analytics on the parking spaces 412a-412l while the vehicle 200b is driving around the parking lot 406. In one example, the video analytics may be configured to detect the parking spaces 412a-412l based on the parking lines. The circuit 102c may detect the vehicle 410f in the parking spot 412g, the vehicle 410g in the parking spot 412h, the vehicle 410h in the parking spot 412j and the vehicle 410i in the parking spot 412l. The circuit 102c may detect an empty parking space 420b in the parking spot 412i and an empty parking space 420c in the parking spot 412k. The metadata generated by the circuit 102b may indicate the location of the parking spots 412g-412l. The metadata generated by the circuit 102b may flag the parking spots 412g, 412h, 412j and 412l as unavailable. The metadata generated by the circuit 102b may flag the parking spot 412i as the available parking space 420b and the parking spot 412k as the available space 420c. While a number of parking spots 412a-412f may be available or occupied, in the example shown, the field of view 202b-204b of the camera system 100a may not capture the parking spots 412a-412f. The circuit 102b may be configured to detect the parking spaces 412a-412l and then perform geolocation to determine the location of each of the parking spaces with respect to the location of the camera 100b. The geolocation may enable the metadata server 120 to determine the exact location of the available or unavailable parking spaces.

In some embodiments, the parking spots 412a-412l may comprise availability lights (e.g., a light that indicates if the parking spot is occupied or available based on a sensor in the parking spot). The circuit 102b may be configured to detect the presence and/or status of the availability light to determine whether any of the parking spots 412a-412l are occupied. In some embodiments, a parking service system (e.g., parking garage and/or municipal parking meters) may communicate a status of parking spaces. For example, a communication device of the cameras 100a-100n may be configured to read the status of the parking spaces from a parking service system for parking garage and/or municipal parking meters. The data communicated may comprise how long each meter has before it moves to an "expired" state. For example, a street with one or more occupied spots that indicate very low "minutes remaining" until the meter is expired may indicate that drivers are returning and may soon to leave, which may indicate that parking spaces may become available shortly. The circuits 102a-102n may be configured to convert the data communicated by the parking service system (e.g., parking garage and/or municipal meters) into metadata that may be uploaded to the metadata server 120, similar to the metadata generated from the computer vision analysis.

In some embodiments, the parking garage and/or municipal meters may be configured to communicate with the metadata server 120. The metadata server 120 may send a request to the parking garage and/or the municipal meters to reserve a parking space for one of the users 170a-170n. For example, the municipality and/or parking garage owner may receive a reward from the system 50 for reserving a parking space. In response to one of the users 170a-170n reserving a parking space, the metadata server 120 may communicate with the parking garage and/or municipal meters. The parking garage and/or municipal meters may accept the request and find an open parking space. The open parking space may be reserved by changing the status of the municipal meter to 'reserved' or changing a status light for a parking space in a parking garage to indicate that the parking space is not available until the parking user that requested the space arrives.

The signal META generated by the camera system 100c may provide the metadata server 120 information about the availability of the available parking space 420a. The signal META generated by the camera system 100c may provide the metadata server 120 information about the unavailability of the parking spaces occupied by the vehicles 410a-410c. Additionally, information about the vehicles 410a-410c may be provided (e.g., make, model, year, OCR information from the license plate, etc.) that may be used for the statistical analysis of the historical data module 314. The signal META generated by the camera system 100b may provide the metadata server 120 information about the availability of the available parking spaces 420b-420c. The signal META generated by the camera system 100c may provide the metadata server 120 information about the unavailability of the parking spots 412g, 412h, 412j and 412l occupied by the vehicles 410f-410i. Additionally, information about the vehicles 410f-410i may be provided (e.g., make, model, year, OCR information from the license plate, etc.) that may be used for the statistical analysis for the historical data module 314.

In response to the CPU 122 analyzing the metadata 158 stored in the database 130, the metadata server 120 may recommend a parking space for the vehicle 200a. In the example shown, the metadata server 120 may determine that the available parking spaces 420a-420c may be near the location of the vehicle 200a. The metadata server 120a may communicate the signal PSPOT_A to the camera system 100a comprising the recommendation for one or more of the available parking spaces 420a-420c.

In some embodiments, the metadata server 120a may recommend all of the available parking spots 420a-420c for the vehicle 200a. The user may select one of the available parking spots 420a-420c as desired. In one example, after the parking user has selected one of the available parking spots 420a-420c, the camera system 100a may send a confirmation signal to the metadata server 120 and the metadata server 120 may remove the selected available parking spot to prevent recommending the same spot to another user.

In some embodiments, the metadata server 120*a* may determine a best parking space to the vehicle 200*a*. Which of the available parking spaces 420*a*-420*c* is determined to be the best for the vehicle 200*a* may be based on a variety of factors that may be analyzed by the CPU 122. In an example, the user profiles 156 of each of the users 170*a*-170*n* may comprise information about parking preferences for each user. For example, one user may not like parallel parking. In another example, one user may have an expensive car and may want to park near other empty spots (e.g., to try and prevent receiving a ding or scratch by a careless driver). In yet another example, one user may prefer to avoid parking fees and/or paying a parking meter. In still another example, one user may prefer the closest space to a destination regardless of the fee. In another example, one user may prefer to have a parking space with shade. In yet another example, one user may prefer to have a parking space next to a curb (e.g., so that at least one side is not exposed to another parked car in order to avoid dings). In another example, one user may have a compact car and may prefer to have a parking space that has a column (or street light) that may prevent larger cars from parking in the space. The various factors analyzed by the metadata server 120 may be varied according to the design criteria of a particular implementation.

In the example shown, the available parking space 420*a* may be closest to the parking vehicle 200*a*, but may be less convenient to reach. For example, the road 402 may be a one-way street. The vehicle 200*a* may have to take a detour to turn around to be able to enter the road 402 in the direction for parking in the available parking space 420*a*. Despite being farther away (e.g., the vehicle 200*a* may have to enter the parking garage and drive to the top floor for the parking lot 406), one of the available parking spaces 420*b*-420*c* may be the best option for the vehicle 200*a*. However, if the parking lot 406 requires a fee for parking, the metadata server 120 may not recommend the available parking spots 420*b*-420*c*. In another example, the metadata server 120 may take into account various metrics for recommending a parking space (e.g., break-in statistics, vehicle thefts, hit-and-run incidents, etc.). For security purposes, a parking spot in a covered parking garage may be preferred to a parking spot on a busy street. The recommendation provided by the signals PSPOT_A-PSPOT_N may be determined according to the specific circumstances of each request by the parking users.

Figure 8:
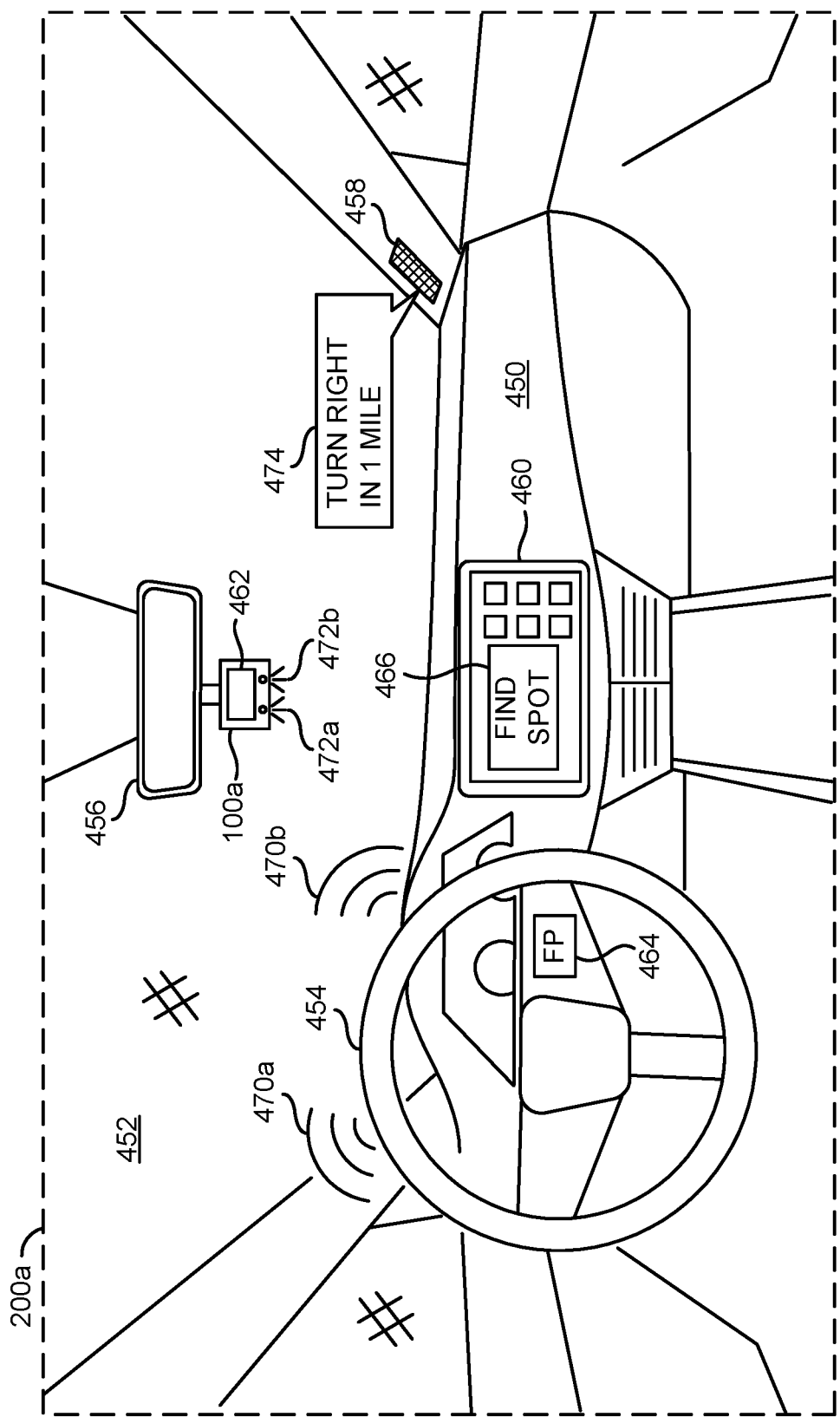
FIG. 8 is a diagram illustrating navigation instructions to an available parking space.

Referring to FIG. 8, a diagram illustrating navigation instructions to an available parking space is shown. An interior view of the vehicle 200*a* is shown. The interior view of the vehicle 200*a* is shown as a representative example of any of the vehicles 200*a*-200*n* implementing the camera systems 100*a*-100*n*.

The interior view of the vehicle 200*a* may comprise a dashboard 450, a windshield 452, a steering wheel 454, a rear view mirror 456 and/or a speaker 458. The camera system 100*a* is shown mounted to the rear view mirror 456. In some embodiments, the camera system 100*a* may be hidden behind the rear view mirror 456. However, in the example shown, the camera system 100*a* is visible for illustrative purposes.

An infotainment system 460 is shown on the dashboard 450. The infotainment system 460 may comprise a touchscreen display. The infotainment system 460 may be configured to receive touch input (or near-touch input) from the driver (or other occupants in the vehicle 200*a*). The infotainment system 460 may be configured to display video content (e.g., display the video frames generated by the camera system 100*a*, display video generated by other cameras of the vehicle 200*a*, display video for various software, etc.).

The camera system 100*a* is shown comprising a display 462. In some embodiments, the display 462 may be a touchscreen display. The display 462 may comprise functionality similar to the infotainment system 460. The display 462 may enable input/output for the camera system 100*a*. In an example, the display 462 may output the signal IMG to display video captured by the camera system 100*a*. In another example, the display 462 may receive touch input (or input from physical buttons implemented by the camera system 100*a* (not shown)) for adjusting settings of the camera system 100*a*.

A button 464 is shown on the steering wheel 454. The button 464 may be configured to receive input from the driver of the vehicle 200*a*. The button 464 may be configured to generate a request. In an example, the system 50 may generate the signal LOC_A in response to the driver pressing the button 464. Pressing the button 464 may enable the driver to request a recommendation for a parking spot.

A button 466 is shown on the infotainment unit 460. The button 466 may be a software button (e.g., not a physical button). In some embodiments, the vehicle 200*a* and/or the infotainment unit 460 may implement a physical button that implements the functionality of the button 466. The button 466 may have similar functionality to the button 464. The button 466 may be configured to generate a request. In an example, the system 50 may generate the signal LOC_A in response to the driver pressing the button 466. Pressing the button 466 may enable the driver to request a recommendation for a parking spot. A button similar to the buttons 464-466 may be implemented by the camera system 100*a* and/or on the user device 112*a*. For example, the driver may interact with the display 462 and/or the user device 112*a* to generate a request for the parking spot.

Lines 470*a*-470*b* are shown emanating from the steering wheel 454. The lines 470*a*-470*b* may represent haptic feedback generated by the steering wheel 454. The steering wheel 454 may be configured to generate one or both of the haptic feedback 470*a*-470*b*. In an example, the left haptic feedback 470*a* may be generated without also generating the right haptic feedback 470*b*. Similarly, the right haptic feedback 470*b* may be generated without also generating the left haptic feedback 470*a*. The left haptic feedback 470*a* and/or the right haptic feedback 470*b* may provide a directionality indication. For example, the steering wheel 454 may generate the left haptic feedback 470*a* in response to a notification meant to draw the attention of the driver to the left of the vehicle 200*a*.

Lights 472*a*-472*b* are shown generated by the camera system 100*a*. The lights 472*a*-472*b* may represent visual feedback generated by the camera system 100*a*. The camera system 100*a* may be configured to generate one or both of the lights 472*a*-472*b*. In an example, the left light 472*a* may be generated without also generating the right light 472*b*. Similarly, the right light 472*b* may be generated without also generating the left light 472*a*. The left light 472*a* and/or the right light 472*b* may provide a directionality indication. For example, the camera system 100*a* may generate the left light 472*a* in response to a notification meant to draw the attention of the driver to the left of the vehicle 200*a*.

A speech bubble 474 is shown. The speech bubble 474 may represent an audio indicator generated by the speaker

458. In one example, the audio indication 474 may comprise an audible tone. In another example, the audio indication 474 may comprise a speech message. In the example shown, the audio indication 474 may comprise the speech message of "turn right in 1 mile". The audio indication 474 may be configured to provide audio feedback and/or provide instructions to the driver of the vehicle 200*a*.

Each of the haptic feedback 470*a*-470*b*, the lights 472*a*-472*b* and/or the audio indication 474 may comprise notification systems utilized by various systems of the vehicle 200*a*. In an example, the haptic feedback 470*a*-470*b*, the lights 472*a*-472*b* and/or the audio indication 474 may be used for various types of feedback (e.g., a vehicle located in a blind spot, a GPS/GNSS navigation, integration with smartphones, etc.). The system 50 may leverage the various notification systems that may be implemented in the vehicle 200*a*.

The system 50 may utilize the haptic feedback 470*a*-470*b*, the lights 472*a*-472*b* and/or the audio indication 474 to provide the driver information about the available parking spaces determined by the metadata server 120. For example, the haptic feedback 470*a*-470*b*, the lights 472*a*-472*b*, the audio indication 474 and/or output generated by other notification systems implemented by the vehicle 200*a* may be generated in response to the signal PSPOT_A.

The information in the signals PSPOT_A-PSPOT_N may be relayed back to the driver seeking a parking location. In one example, the information may be presented by displaying information using the infotainment unit 460 and/or on the display 462 (e.g., the LCD of the dash camera 100*a*). For example, the infotainment unit 460 may be configured to display a map with turn-by-turn directions to the available parking space. In another example, the audio message 474 may be configured to speak turn-by-turn directions to lead the vehicle 200*a* to the available parking space. In one example, the displays (e.g., the infotainment unit 460 and/or the display 462) and/or the lights 472*a*-472*b* may be color coded to provide the driver peripheral vision indicators. For example, the peripheral vision indicators may change color as the driver moves towards a locality that historically and/or in real time is determined by the metadata server 120 to have better chance at parking (e.g., a "hotter" or "colder" visual indicator).

In some embodiments, the information corresponding to the signals PSPOT_A-PSPOT_N may be displayed to the user as part of a smartphone app (e.g., a companion app implemented for the user device 112*a*). In an example, the information may be presented using both the companion app, dash camera 100*a*, the speaker 458 and/or the infotainment unit 460 in unison. In some embodiments, the information from the signals PSPOT_A-PSPOT_N may be displayed to the user with an aftermarket navigation system and/or via OEM equipment as part of a connected car package.

The button 464 on the steering wheel 454, the button 466 on the infotainment unit 460, a button on the dash camera 100*a*, using a voice command and/or the companion app implemented by the user device 112*a* may enable the driver of the vehicle 200*a* to initiate a "find parking" feature. In response to initiating the "find parking" feature, the camera system 100*a* and/or the user device 112*a* may generate the signal LOC_A. In one example, the signal LOC_A may be communicated by the dash camera 100*a* via built in LTE to the network 60. In another example, the signal LOC_A may be communicated by the dash camera 100*a* via Bluetooth/Wi-Fi to the smartphone 112*a* and then to the network 60 via 4G/LTE. In yet another example, the signal LOC_A may be communicated by the dash camera 100*a* to a connected communication system of the vehicle 200*a* (e.g., on-board 4G/LTE) to the network 60. In still another example, the signal LOC_A may be communicated directly from the vehicle 200*a* to the network 60, via 4G/LTE (e.g., when the driver uses the button 464 or the button 466). In another example, the signal LOC_A may be communicated directly from the companion app of the smartphone 112*a* to the network 60, via 4G/LTE. The network 60 may forward the signal LOC_A to the metadata server 120. The method of transmitting the "find parking" request may be varied according to the design criteria of a particular implementation.

In response to receiving the find parking request in the signal LOC_A, the metadata server 120 may determine a location of an available parking spot (or a list of parking spots). The metadata server 120 may generate the signal PSPOT_A comprising the information about the location of the available parking spot. The signal PSPOT_A may be communicated to the network 60, and the network 60 may forward the signal PSPOT_A to the vehicle 200*a*, the camera system 100*a* and/or the user device 112*a*.

In some embodiments, the signal PSPOT_A may be configured to provide audio cues to the user. For example, the vehicle 200*a* may receive the signal PSPOT_A via the on-board 4G/LTE connection. The speaker 458 may output information that may provide the location of the available parking spot using the audio output 474. In one example, the audio output 474 may comprise audio cues that may be used for a "getting warmer" audio indication. The audio cue may be used in combination with a display on the infotainment unit 460. For example, the audio cues may be configured to change in tone and/or frequency as the vehicle 200*a* moves closer or farther away from the available parking space recommended in the signal PSPOT_A (e.g., similar to the sounds of a Geiger counter). The tone and/or frequency change of the audio output 474 may provide a supplementary indication of the distance to the available parking space while the infotainment unit 460 provides a visual indication (e.g., a map). The audio output 474 may help guide the driver so that the driver may not rely solely on the visual indication (e.g., so the driver pays attention to the road instead of looking at the infotainment unit 460 to prevent driver distraction). For example, the driver may check the infotainment unit 460 while waiting at a parking light to see where the parking spot is, and then rely on the audio output 474 for guidance while actively driving. In another example, the audio output 474 may be generated using the user device 112*a* (e.g., a smartphone, a smartwatch, etc.).

In some embodiments, the signal PSPOT_A may be configured to provide haptic cues to the user. For example, the vehicle 200*a* may receive the signal PSPOT_A via the on-board 4G/LTE connection. The steering wheel 454 may generate the haptic feedback 470*a*-470*b* that may provide the location of the available parking spot. In an example, the haptic feedback 470*a*-470*b* may be built into the steering wheel 454 with an assumption that the driver is using the standard 10 and 2 or 9 and 3 hand position pattern while driving. The haptic feedback 470*a*-470*b* may be configured to provide guidance through touch/vibration. The haptic feedback 470*a*-470*b* may provide guidance about which direction to turn next (e.g., using the left haptic feedback 470*a* for a left turn and the right haptic feedback 470*b* for a right turn) and then both hands (e.g., using both the left and right haptic feedback 470*a*-470*b* simultaneously) when the correct street is being traveled on. In some embodiments, the haptic feedback 470*a*-470*b* may be configured to pulse at a particular frequency as the driver approaches the parking spot (e.g., pulse at a higher frequency, or pulse for longer when the driver is close to the available parking spot similar to a Geiger counter). Similar to the audio cues, the haptic feedback 470a-470b may be configured as supplementary guidance for a visual output on the infotainment unit 460. The haptic feedback 470a-470b may provide a level of guidance to ensure that the driver is focused on the road instead of looking at the infotainment unit 460 or the smartphone 112a (e.g., prevent driver distraction).

In some embodiments, the signal PSPOT_A may be configured to provide peripheral vision cues to the user. For example, the camera system 100a may receive the signal PSPOT_A via a 4G/LTE connection and/or via the user device 112a. The lights 472a-472b may be generated to provide the location of the available parking spot. The lights 472a-472b may be generated as a visual indication that may be seen in the peripheral vision of the driver. In one example, the left light 472a may be configured to blink to indicate a left turn, the right light 472b may blink to indicate a right turn and both lights 472a-472b may blink simultaneously to indicate the driver is on the same street as the available parking spot. Similarly, the infotainment unit 460 and/or the display 462 may generate an overlay that may cause the screen to pulse or blink on particular sides of the screen (e.g., left half of the screen for a left turn and right half of the screen for a right turn). The infotainment unit 460 and/or the display 462 may provide navigation instructions as a color coded indicator configured to the indication such that the indication is visible in the peripheral vision of the driver. The color coding may be based on how far away the driver is from the parking space (e.g., red is far away, green is close, etc.). In another example, the frequency of the blinking of the lights 472a-472b (or the screen of the infotainment unit 460) may increase as a turn approaches. In yet another example, the color of the lights 472a-472b (or the screen of the infotainment unit 460 or the display 462) may change to a different color to indicate a left turn, a right turn and that the vehicle 200a is on the correct street. Similar to the audio cues, and the haptic feedback 470a-470b, the blinking of the lights 472a-472b, the screen of the infotainment unit 460 or the display 462 may be configured as supplementary guidance (e.g., navigation instructions) for a visual output on the infotainment unit 460 (e.g., a detailed map). The blinking lights 472a-472b may provide a level of guidance that may be seen in the peripheral vision while looking at the road in order to ensure that the driver is focused on the road instead of looking at the infotainment unit 460 or the smartphone 112a (e.g., prevent driver distraction). The haptic feedback 470a-470b and/or the blinking lights 472a-472b may enable guidance for hearing impaired.

In some embodiments, the signal PSPOT_A may be configured to provide turn-by-turn guidance. In one example, the audio output 474 may provide turn-by-turn guidance (e.g., "turn right in 1 mile", or "you have arrived at the parking spot"). In another example, the camera system 100a and/or the smartphone 112a may be configured to generate audio to provide the turn-by turn guidance. In some embodiments, the infotainment unit 460 and/or the display 462 may generate a map interface configured to provide a map of the current location of the vehicle 200a and the location of the parking spot.

Figure 9:
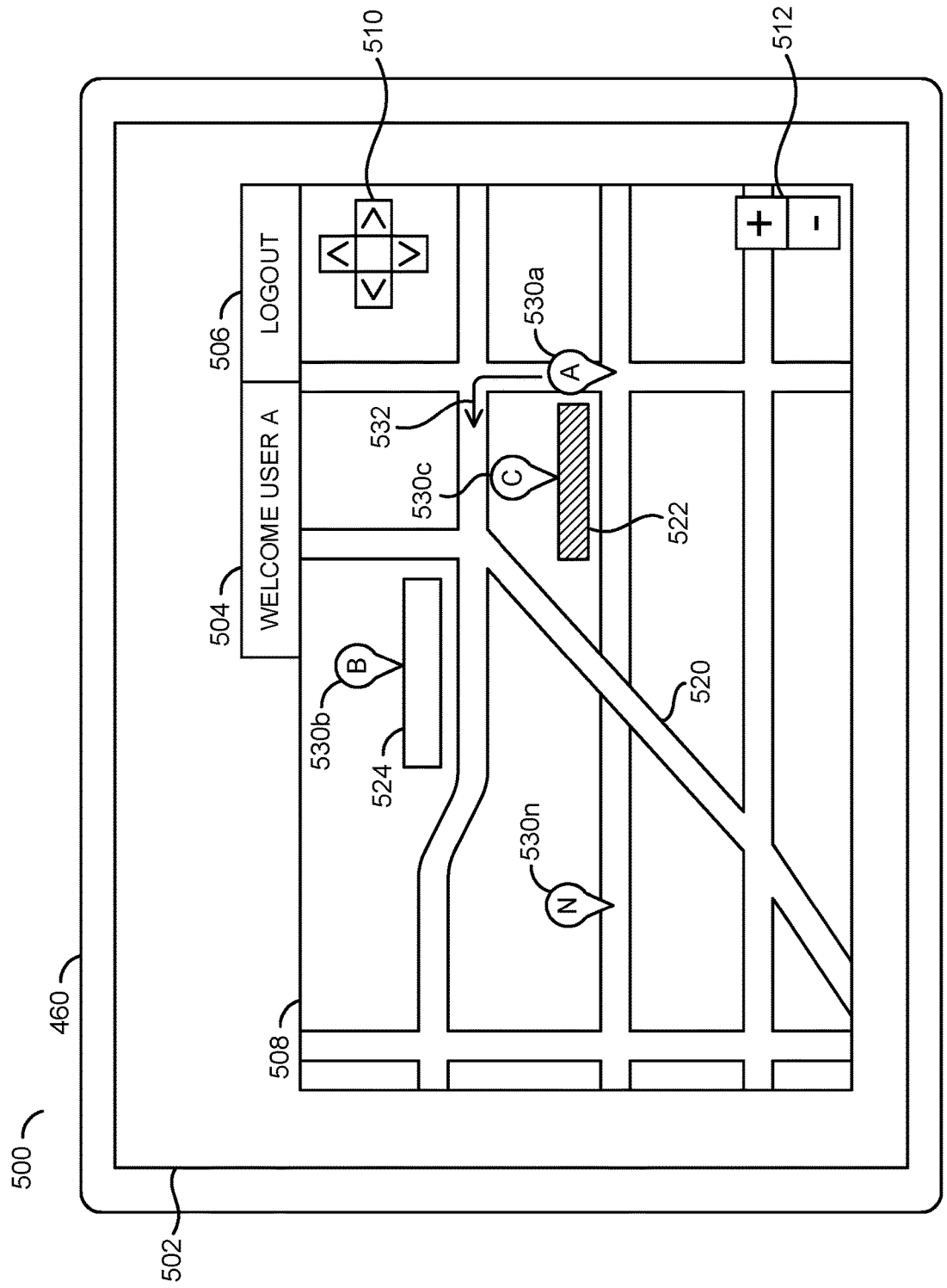
FIG. 9 is a diagram illustrating turn-by-turn navigation instructions to an available parking space provided via an infotainment unit.

Referring to FIG. 9, a diagram illustrating turn-by-turn navigation instructions to an available parking space provided via an infotainment unit is shown. An example turn-by-turn navigation output 500 is shown. In the example shown, the example turn-by-turn navigation 500 is implemented using the infotainment unit 460. In another example, the example turn-by-turn navigation 500 may be implemented using the display 462 of the camera systems 100a-100n. In yet another example, the turn-by-turn navigation 500 may be implemented using the display of the smartphone 112a. While the example turn-by-turn navigation 500 is shown on the infotainment unit 460 as a representative example, similar implementations may be used for the display 462 and/or the smartphone 112a.

The infotainment unit 460 is shown comprising a display 502. The display 502 may be the touchscreen display configured to receive touch (or near-touch) input and generate a visual output. The display 502 may output an interface and/or overlay for the turn-by-turn navigation. In the example shown, the interface for the turn-by-turn navigation may comprise a greeting 504, a button 506 and a map display 508.

The greeting 504 may provide an indication that the user is logged into the system 50. For example, the user may log into the metadata server 120 and the app running the turn-by-turn navigation may receive information about the user from the database 130 (e.g., a name, user-defined preferences, credentials for a subscription service tier, etc.). The button 506 may be one example software button that may be available to the user. In the example shown, the button 506 may be a logout button (e.g., configured to log the user out of the metadata server 120). In another example, the button 506 may be used to select a settings/preferences sub-menu. In yet another example, the button 506 may be used to request a parking space. In still another example, the button 506 may be configured to open a sub-menu to enable the driver to provide feedback about the parking space recommendation. The number and/or types of buttons available in the turn-by-turn navigation may be varied according to the design criteria of a particular implementation.

The map display 508 may comprise panning buttons 510 and zoom controls 512. The panning buttons 510 may enable a user to pan the map to show different locations. The zoom controls 512 may enable the user to zoom in and zoom out of the map display 508 in order to show more details of a smaller area or fewer details of a larger area. In some embodiments, the touchscreen display 502 may be configured to accept input for panning (e.g., swiping touch gestures) and zooming (e.g., pinch to zoom) instead of implementing the panning buttons 510 and/or the zoom controls 512.

The map display 508 is shown displaying a map of roads 520. A parking area 522 and a parking area 524 is displayed on the map display 508. The map display 508 may be used for general GPS/GNSS navigation with or without the parking spot navigation feature. In an example, the system 50 may leverage the functionality of the map display 508 that may already be implemented by the infotainment unit 460 and/or the smartphone 112a.

The map display 508 is shown comprising a number of location pins 530a-530n. The location pins 530a-530n may comprise visual indications of the location of various locations of interest. In the example shown, the location pin 530a may comprise a location of the vehicle 200a. The location pin 530a may correspond to the current location of the vehicle 200a that may be communicated to the metadata server 120 with the signal LOC_A when the request for a parking space is initiated. The location pin 530a may be configured to move around the roads 520 as the driver drives the vehicle 200a (e.g., as the vehicle 200a changes location). In the example shown, the location pins 530b-530n may comprise locations of known parking spots. In some embodiments, the location pins 530b-530n may comprise locations of other types of areas of interest not necessarily related to parking (e.g., locations of stores, locations of municipal buildings, locations of camp grounds, locations of schools, pre-defined locations set by the driver, etc.).

In the example shown, the location 530b may comprise the parking area 524. The parking area 524 is shown without shading, which may be a visual indication that there is parking available in the parking area 524. In the example shown, the location 530c may comprise the parking area 522. The parking area 522 is shown with shading, which may be a visual indication that there is parking unavailable in the parking area 522. In the example shown, the location 530n may comprise a street parking space. The visual indicators that may illustrate whether the parking lots 522-524 have available parking may be updated in real-time. In an example, as other drivers gather metadata about the availability of parking spaces while driving around, the metadata server 120 may continually (or periodically) generate the signals PSPOT_A-PSPOT_N to enable the real-time updates of the availability of parking spots for the system 50. In an example, if one of the camera systems 100a-100n performs computer vision analytics and detects a newly opened parking space in the parking lot 522, the visual indication for the parking lot 522 on the map display 508 may be changed to indicate parking may now be available (e.g., change from shaded to unshaded).

An arrow 532 is shown on the roads 520. The arrow 532 may comprise a navigation arrow. The navigation arrow 532 is shown extending from the location pin 530a for the vehicle 200a. The navigation arrow 532 may comprise the turn-by-turn navigation for the vehicle 200a to the destination of the available parking spot provided by the signals PSPOT_A-PSPOT_N. The arrow 532 may be generated in response to navigation instructions communicated to the infotainment unit 460 from the metadata server 120. The arrow 532 may display the navigation instructions as turn-by-turn directions displayed on the digital map 508.

In an example, the vehicle 200a may be the parking vehicle with a current location at the location pin 530a. The driver may request a parking location nearby. The camera system 100a may generate the signal LOC_A to provide the metadata server 120 a request for the parking vehicle 200a. The signal LOC_A may comprise the current location (e.g., comprising GPS/GNSS coordinates that correspond to the location of the location pin 530a). The camera system 100a may communicate the signal LOC_A to the user device 112a via a Bluetooth connection or a Wi-Fi connection. The user device 112a may send the signal LOC_A to the metadata server 120 via a 4G/5G/LTE connection.

Meanwhile, the metadata server 120 may receive the signal META from multiple users (e.g., the camera systems 100a-100n implemented in the vehicles 200a-200n). The CPU 122 may analyze the metadata to determine which parking spaces are available or unavailable. The CPU 122 may identify available and/or unavailable spaces in response to the most recently received information (e.g., update the availability of a parking space in real-time as new data arrives). The CPU 122 may identify available and/or unavailable spaces in response to historical and/or statistical data analyzed by the historical data module 314. In some embodiments, the metadata server 120 may continually update the status of all parking spaces (e.g., always keep parking space information up to date). In some embodiments, the metadata server 120 may wait for a request that corresponds to a particular area and in response to the request the CPU 122 may search the stored metadata 158 for nearby parking spaces and then determine if any of those nearby parking spaces are available or unavailable.

The CPU 122 of the metadata server 120 may search the metadata 158 in response to the signal LOC_A. The CPU 122 may determine the location of the parking vehicle 200a from the current location provided by the signal LOC_A. The CPU 122 may analyze the metadata 158 in order to determine which parking spots are near the parking vehicle 200a and the status (e.g., available or unavailable) of the nearby parking spots. The CPU 122 may select an available parking spot or a list of available parking spots for the parking vehicle 200a based on the current location of the parking vehicle 200a, any preferences of the user and the availability of nearby parking spots. The selected parking spot(s) may be communicated in the signal PSPOT_A. The metadata server 120 may generate the signal PSPOT_A in response the signal LOC_A.

In the example shown, the metadata server 120 may determine the parking lot 522 does not have available parking spaces. The metadata server 120 may determine that the parking lot 524 and the parking location pin 530n does have available parking spaces near the vehicle 200a. The metadata server 120 may determine that the parking lot 522 is closer to the vehicle 200a than the location pin 530n. The metadata server 120 may select the parking spot in the parking lot 524 for the parking vehicle 200a.

In some embodiments, the metadata server 120 may determine that the parking lots 522-524 (or individual spaces in the parking lots 522-524) are reserved and/or conditional parking spaces (e.g., disabled parking, designated for expecting mothers, limited to one hour parking, etc.). The metadata server 120 may track reserved and/or conditional parking spaces, determine whether the users 170a-170n have the appropriate credentials (e.g., a disabled permit, a city permit, etc.) and/or whether the preferences of the particular user allowed being suggested a particular type of reserved and/or conditional parking space. For example, a user may not wish to worry about having a time limit on parking and may set preferences to avoid being recommended a parking space with a one hour time limit.

The user device 112a may receive the signal PSPOT_A via the 4G/5G/LTE connection. The user device 112a may send the signal PSPOT_A to the camera system 100a and/or the infotainment unit 460 via a Bluetooth/Wi-Fi connection. In some embodiments, the infotainment unit 460 may implement a 4G/5G/LTE connection that may be configured to receive the signal PSPOT_A. If the signal PSPOT_A comprises multiple parking spot options, the infotainment unit 460 may provide a list of options to the driver. In one example, the audio output 474 may provide an audio list of parking spot locations. In another example, the touchscreen display 502 may output a list of parking spot options that may be selected for the driver. The infotainment unit 460 may display the selected parking spot. If the signal PSPOT_A comprises a single parking spot option, the infotainment unit 460 may display the selected parking spot.

The infotainment unit 460 may determine the location of the selected parking spot from the signal PSPOT_A. The infotainment unit 460 may generate the location pin 530b to illustrate the location of the parking spot at the parking lot 524. In some embodiments, the infotainment unit 460 may be configured to compare the location of the current location of the vehicle 200a (e.g., the location pin 530a) to the location of the available parking spot (e.g., the location pin 530b) and determine turn-by-turn directions. In some embodiments, the metadata server 120 may compare the location of the current location of the vehicle 200a from the signal LOC_A to the location of the available parking spot selected and determine turn-by-turn directions that may be communicated with the signal PSPOT_A.

In response to determining the turn-by-turn directions, the infotainment unit 460 may generate the navigation arrow 532. The navigation arrow 532 may be updated in real-time with respect to the location pin 530*b* of the selected parking space as the vehicle 200*a* moves. In some embodiments, the haptic feedback 470*a*-470*b*, the blinking lights 472*a*-472*b* and/or the audio output 474 may be generated along with the turn-by-turn navigation arrow 532.

Figure 10:
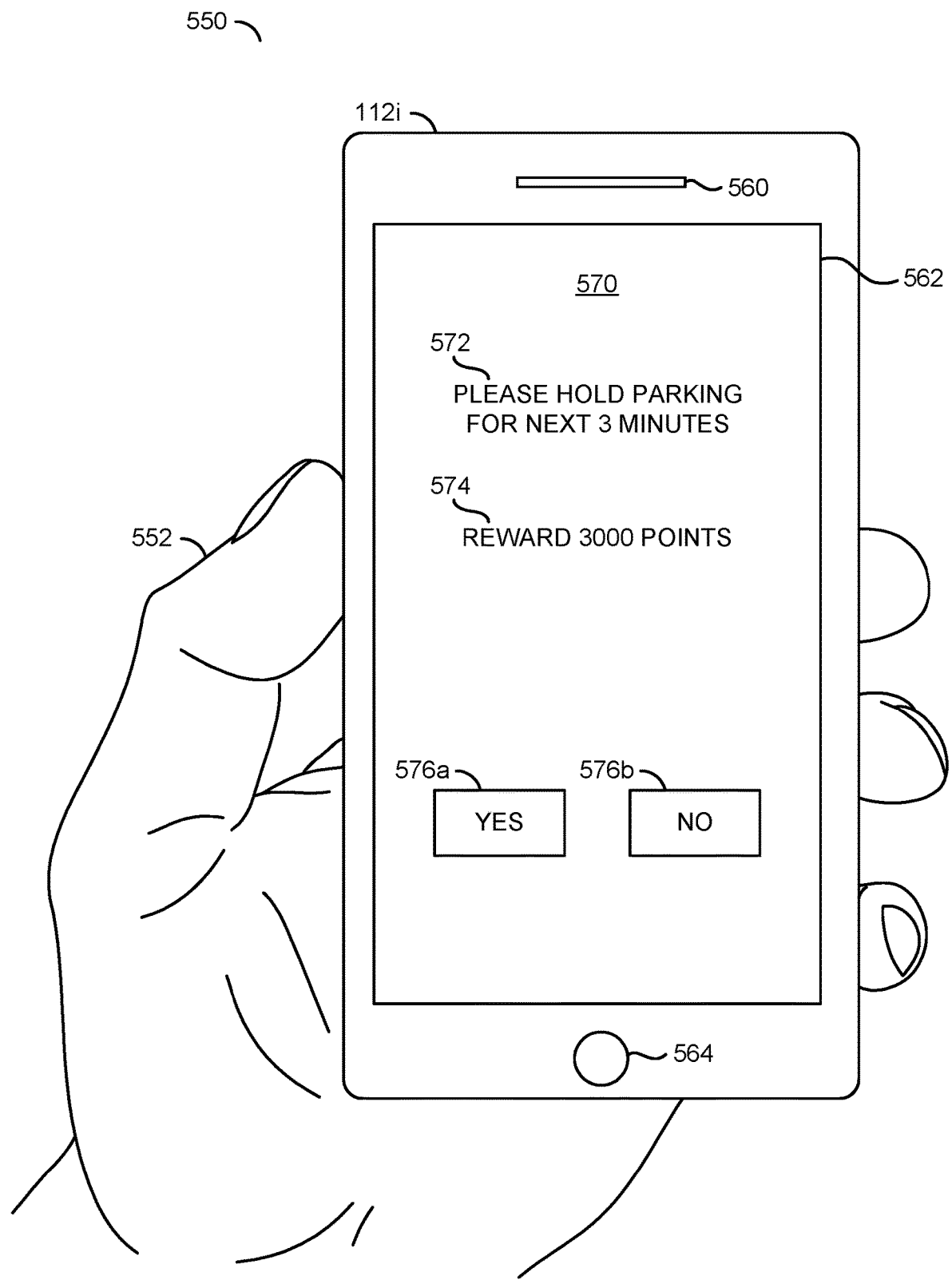
FIG. 10 is a diagram illustrating a parking space holding request presented to a user.

Referring to FIG. 10, a diagram illustrating a parking space holding request presented to a user is shown. An example of a hold request 550 is shown. The hold request 550 is shown displayed using the user device 112*i*. The user device 112*i* is shown as a smartphone held by a user 552. The user 552 may be one of the users 170*a*-170*n* registered in the database 130. The user 552 may be a driver of one of the vehicles 200*a*-200*n* that may be currently parked in a parking space (e.g., not searching for a parking space).

The smartphone 112*i* is shown comprising a speaker 560, a touchscreen display 562 and a microphone 564. The touchscreen display 562 may be configured to receive touch input from the user 552 and display video output. A companion app 570 is shown displayed on the touchscreen display 570. The companion app 570 may comprise computer readable instructions (e.g., a software application) that may be configured to be executed by the smartphone 112*i* and/or other computing devices. The companion app 570 may be configured to enable the user 552 to interact with the system 50. For example, the companion app 570 may be configured to enable the user 552 to adjust preferences, register with the metadata server 120, request parking spaces, receive directions to the parking spaces, view video recordings uploaded by the users 170*a*-170*n*, receive reports based on the metadata 158, etc. The functionality of the companion app 570 may be varied according to the design criteria of a particular implementation.

The companion app 570 is shown displaying a hold parking spot request 572. The hold parking spot request 572 may be one of the features implemented by the companion app 570. The companion app 570 is shown displaying the hold parking spot request 572, a reward 574 and/or software buttons 576*a*-576*b*.

The hold parking spot request 572 may comprise a message to the user 552. The hold parking spot request 572 may ask the user 552 to volunteer to hold a parking spot currently occupied by the user 552 for another one of the users 170*a*-170*n* (e.g., the driver of the parking vehicle 200*a*). The hold parking spot request 572 may request the user 552 wait a short amount of time. In the example shown, the hold parking spot request 572 may ask the user 552 to hold the parking spot for the next three minutes.

The reward 574 may comprise a gamification feature for the hold parking spot request 572. The reward 574 may provide an incentive for the user 552 to accept the hold parking spot request 572. While the user 552 may decide to accept the hold parking spot request 572 for altruistic purposes (e.g., without a reward), the reward 574 may provide an incentive to the user 552. In the example show, the reward may comprise a reward of three thousand points. The points may be used by the metadata server 120 to create a leaderboard and/or a competition between the users 170*a*-170*n*. The competition may provide an incentive to the users to encourage accepting the requests. In some embodiments, the reward 574 may comprise monetary compensation (e.g., a cash reward, a coupon for additional service tiers for the system 50, etc.).

The software buttons 576*a*-576*b* may enable the user 552 to select whether to accept or decline the hold parking spot request 572. The software button 576*a* may accept the hold parking spot request 572. The software button 576*b* may decline the hold parking spot request 572. The user 552 may not be punished for declining the request. Holding the parking spot may be voluntary in order to help the crowd-sourced community of the users 170*a*-170*n*.

The parking user (e.g., the driver of the parking vehicle 200*a*) may send a request for a parking spot to the metadata server 120. The metadata server 120 may determine which of the users 170*a*-170*n* are currently parked in a parking space near the parking user. In one example, the metadata server 120 may determine if any of the users 170*a*-170*n* are in a parking spot nearby the parking user when no other spots are available. In another example, the metadata server 120 may determine if any of the users 170*a*-170*n* are in a parking spot nearby the parking user even if other parking spots are available if any of the users 170*a*-170*n* are in a desired parking spot (e.g., a better spot that may be close to the destination, a shady parking spot, a safe parking location, etc.). If any of the users 170*a*-170*n* nearby are in a parking spot, the metadata server 120 may generate the signals PSPOT_A-PSPOT_N to the users 170*a*-170*n*. The signals PSPOT_A-PSPOT_N may comprise the hold parking spot request 572. The user devices 112*a*-112*n* may receive the signals PSPOT_A-PSPOT_N with the hold parking spot requests 572 and generate the hold parking spot requests 572 on the touchscreen display 562.

Other dash camera systems 100*b*-100*n* in the same locality of the parking user may be notified that another driver participating in the program that is geographically close by may be looking for parking. In one example, through vision based analytics the dash cameras (e.g., 100*b*-100*n*) may determine that the host vehicle (e.g., the respective vehicles 200*b*-200*n*) is exiting a parking space. A real time notification may be sent and to the driver searching for the parking spot with location details.

The dash camera systems (e.g., 100*b*-100*n*) that have become cognizant that the respective host vehicles (e.g., 200*b*-200*n*) is currently exiting a parking spot that is sought after by another participant of the system 50 (e.g., the users 170*a*-170*n*) may notify the driver of the host vehicle exiting the parking spot to ask if the user 552 may be willing or able to delay exiting the parking spot for a short time (e.g., essentially holding the parking spot for the incoming driver).

In some embodiments, if none of the users 170*a*-170*n* accept the request, the reward 574 may be increased and the request may be re-sent. If none of the users 170*a*-170*n* accept the request, the metadata server 120 may find an alternate parking location for the parking user. If one of the users 170*a*-170*n* accepts the request (e.g., selects the button 576*a*), the user device (e.g., 112*i*) may generate the signal LOC_I comprising the location of the parking spot that is being held. The metadata server 120 may communicate the signal PSPOT_A to the parking user to provide the location of the held parking spot.

In response to accepting the hold parking spot request 572, the user 552 exiting the parking spot may be given an approximate estimated time of arrival of the parking user (e.g., the vehicle 200*a*). The driver may be notified in a number of ways or in a combination of ways including a speaker implemented by the dash camera 1001, the display 462 of the dash camera 1001, the smartphone screen 562, the smartphone speaker 560, the in car infotainment system 460, aftermarket GPS system screen, the speaker 458, etc.

In some embodiments, the driver 552 holding the parking spot may be updated with the estimated time of arrival of the parking user via the map display 508. For example, one of the location pins 530a-530n may correspond to a real-time location of the parking vehicle 200a. Identifying details (e.g., make, model, year, color, etc.) of the approaching vehicle may be communicated to the driver 552 holding the parking spot to enable the driver 552 to know which car to relinquish the parking spot to when the parking vehicle 200a approaches the location.

In some embodiments, the reward 574 may be increased as the desired time approaches (e.g., if the parking user requests a parking spot in advance for a particular time). In some embodiments, the reward 574 may provide an incentive for a ride share driver (or a taxi driver) that is nearby and waiting for a next pickup. The rideshare driver may be motivated to drive up and down the street looking for parking while another one of the users 170a-170n runs errands. In some embodiments, the reward 574 may be set by the parking user (e.g., the parking user may set a reward of $20 to hold a spot for a particular time). For example, the parking user may be going on a date and want to impress the date by parking close by to pick the partner up right on time to avoid making the date walk a long distance. In another example, the parking user may request a parking spot be held near a restaurant on a rainy day to prevent long walks in the rain.

In some embodiments, after the parking user has specified a substantial reward to hold a spot in a certain locality at a given time then the system 50 may alert the other drivers 170a-170n as the drivers 170a-170n enter the locality as the desired time approaches. For example, a ride share driver may pass through the area with a passenger in tow and the system 50 may ask the driver 552 to hold a spot for a few minutes. The ride share driver may be able to ask the passenger or even reward the passenger if they are able to hold at a given location for a specified amount of time. In some embodiments, the ride share passenger may be automatically given a small discount for agreeing to the delay.

The request to hold a parking space 572 may be used to develop an ecosystem of drivers similar to the ride sharing space. The users 170a-170n may work a few hours a day responding to the hold parking space requests 572, driving to the area, holding a spot, and then move to the next request.

Figure 11:
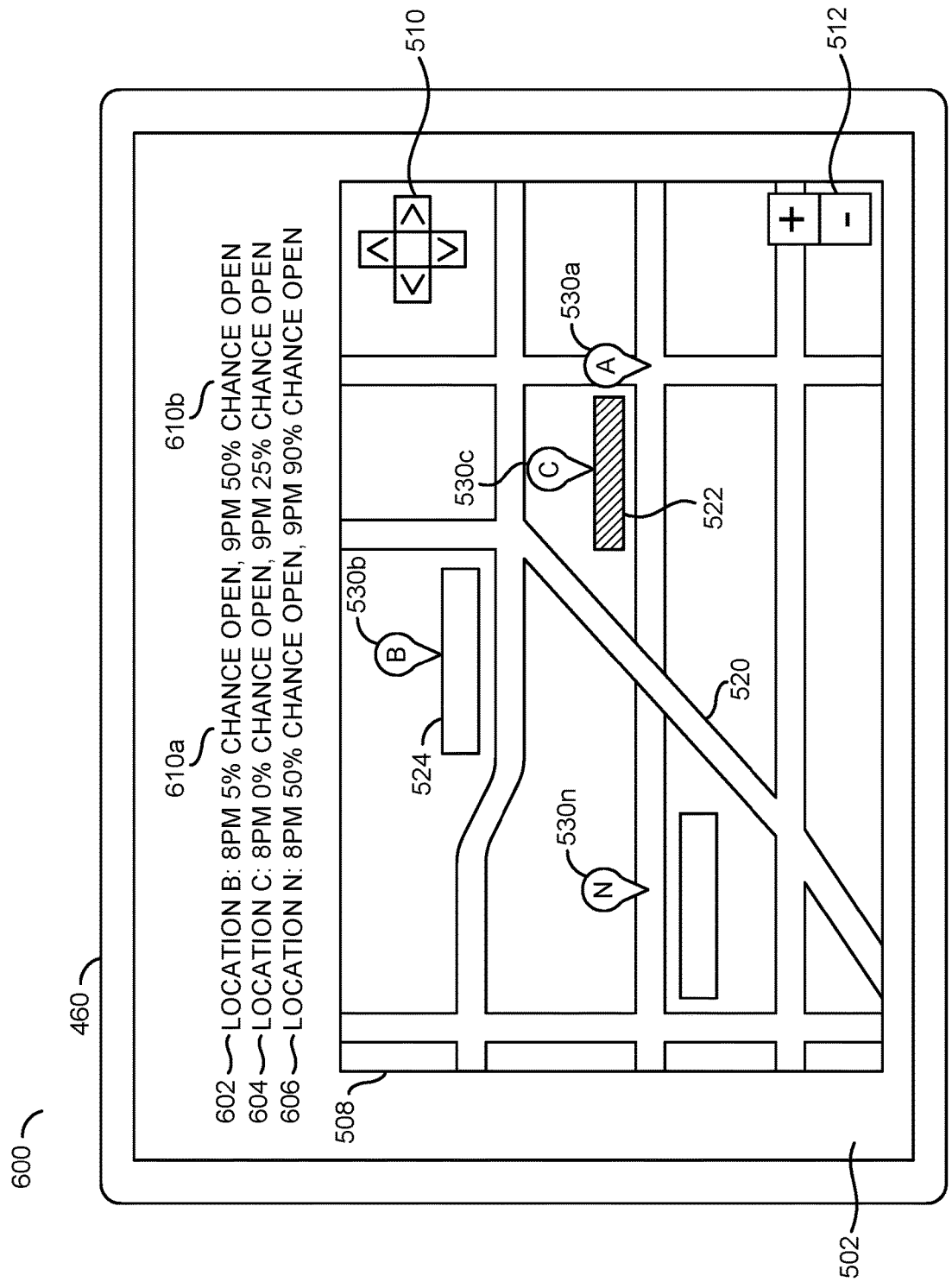
FIG. 11 is a diagram illustrating a probability analysis performed based on historical parking space availability.

Referring to FIG. 11, a diagram illustrating a probability analysis performed based on historical parking space availability is shown. An example probability analysis output 600 is shown. In the example shown, the example probability analysis output 600 is implemented using the infotainment unit 460. In another example, the example probability analysis output 600 may be implemented using the display 462 of the camera systems 100a-100n. In yet another example, the example probability analysis output 600 may be implemented using the display of the smartphone 112a. While the example probability analysis output 600 is shown on the infotainment unit 460 as a representative example, similar implementations may be used for the display 462 and/or the smartphone 112a.

The infotainment unit 460 is shown comprising the display 502. The display 502 is shown with the map display 508, the panning buttons 510 and/or the zoom controls 512. The map display 508 may comprise the roads 520, the parking locations 522-524 and/or the location pins 530a-530n. The map display 508, the panning buttons 510, the zoom controls 512, the roads 520, the parking locations 522-524 and/or the location pins 530a-530n may have a similar implementation as described in association with FIG. 9.

Parking probability statistics 602-606 are shown on the display 502. The probability statistics 602-606 may comprise results of statistical analysis performed by CPU 122 of the metadata server 120 (e.g., using the historical data module 314) about the likelihood of the availability of parking spots. The probability statistics 602-606 may comprise time slots 610a-610b. While two time slots 610a-610b are shown for illustrative purposes, each of the probability statistics 602-606 may comprise time slots for each hour, 15 minute interval, day of the week, month of the year, etc.

In the example shown, the probability statistics 602 may correspond to the parking location 524 located at the location pin 530b. The time slot 610a for the probability statistics 602 may indicate that the probability of finding a parking spot at the parking location 524 at 8 pm may be 5%. The time slot 610b for the probability statistics 602 may indicate that the probability of finding a parking spot at the parking location 524 at 9 pm may be 50%.

In the example shown, the probability statistics 604 may correspond to the parking location 522 located at the location pin 530c. The time slot 610a for the probability statistics 604 may indicate that the probability of finding a parking spot at the parking location 522 at 8 pm may be 0%. The time slot 610b for the probability statistics 604 may indicate that the probability of finding a parking spot at the parking location 522 at 9 pm may be 25%.

In the example shown, the probability statistics 606 may correspond to the parking location located at the location pin 530n. The time slot 610a for the probability statistics 606 may indicate that the probability of finding a parking spot at the parking location located at the location pin 530n at 8 pm may be 50%. The time slot 610b for the probability statistics 606 may indicate that the probability of finding a parking spot at the parking location located at the location pin 530n at 9 pm may be 90%.

In some embodiments, the historical data module 314 may be configured to analyze how long parking spaces are available. In an example, one of the circuits 102a-102n may detect a parking space is open at a particular time when the vehicle 200a-200n drives by the parking space. However, the historical data module 314 may indicate that the particular parking space rarely remains available long (e.g., a high traffic area, a desired parking space, etc.). The metadata server 120 may determine the likelihood that an available parking space may still be available by the time that the parking user may arrive. For example, if the parking space historically remains available for less than 10 minutes and the driver may not reach the parking space for 20 minutes, then the parking space may not be recommended (e.g., considered unavailable even though the space is currently unoccupied). The probability statistics 602-606 may further comprise an estimated amount of time that an open parking space may remain open.

The probability statistics 602-606 may be generated based on a current status of the parking space. However, the current status of the parking space may be based on old data. For example, the last time one of the cameras 100a-100n captured a particular parking spot may have been minutes, hours or days ago. The age of the metadata about particular parking spots may be taken into account by the CPU 122 when determining the probability statistics 602-606. For example, if the metadata was captured a few minutes ago showing the parking space was empty, the probability statistics 602-606 may have more recency to bias the statistical analysis to indicate that the spot is open. If the metadata was captured hours ago that showed the parking spot was empty, then the probability statistics 602-606 may take into account historical information about how long the space remains open. A busy parking lot may be less likely to still have an open parking space when the age of the metadata was an hour ago.

The probability statistics 602-606 may be generated in response to a prediction calculation performed by the CPU 122. The metadata server 120 may predict the availability of the various parking spaces based on the historical data stored by the historical data module 314. The probability statistics 602-606 may enable the users 170a-170n to decide when and where to park in close proximity to a particular location. For example, if one of the users 170a-170n lives in a San Francisco apartment with no assigned parking and wants to park close to home overnight after work, the probability statistics 602-606 may help locate a parking space near the apartment. In another example, if one of the users 170a-170n needs to park close to a hospital or an office for an appointment and has limited mobility, the probability statistics 602-606 may help locate a parking space nearby. The users 170a-170n may be able to pull up the probability statistics 602-606 to find curated historical data for parking availability.

The probability statistics 602-606 may be configured to provide a historical likelihood of finding parking at a nearby location in a given time period. In the example shown, the probability statistics 602-606 may be displayed on the infotainment unit 460. In some embodiments, the probability statistics 602-606 may be provided through the companion app 570, the display 462 of the camera systems 100a-100n, the speaker 458, etc. In some embodiments, the probability statistics 602-606 may be configured to account for events (e.g., baseball games, concerts, parades, etc.) that may cause parking to be lacking. For example, at 8 pm on a regular day, the probability of finding a parking space may be 90%, but if a baseball game is scheduled, the probability of finding a parking space may drop to 0%. The metadata server 120 may be configured to receive information from network sources about scheduled events. In an example, the probability statistics 602-606 may be provided to the user in response to pressing the button 464 via the audio output 474 (e.g., "no events in the area, Friday nights at 8:15 pm there is an 80% chance of a parking spot becoming available in the next 5 minutes."). In response to a second press of the button 464, an additional audio output 474 be generated (e.g., "30 minutes from now there will be a 95% likelihood that parking will be available").

The probability statistics 602-606 may help the users 170a-170n to plan errands around parking availability. In an example, the user 170a may have an apartment near the parking location 530b and at 8 pm may see the probability of finding a parking spot is only 5%. The user 170a may choose to run an errand (e.g., do grocery shopping at another location, or getting fuel) in order to return to the desired area at a later time when more parking is available. For example, since parking is unavailable at the location 530b at 8 pm, the user 170a may stop to eat at a restaurant for an hour, to be able to return to the location 530b at 9 pm when the chance of finding a parking space is 50%. In some embodiments, the user 170a may initiate a hold parking spot request 572 for the next 30 minutes to notify the other users 170b-170n that the reward 574 may be available if a parking spot is held in the parking lot 524 around 8:45 PM.

Figure 12:
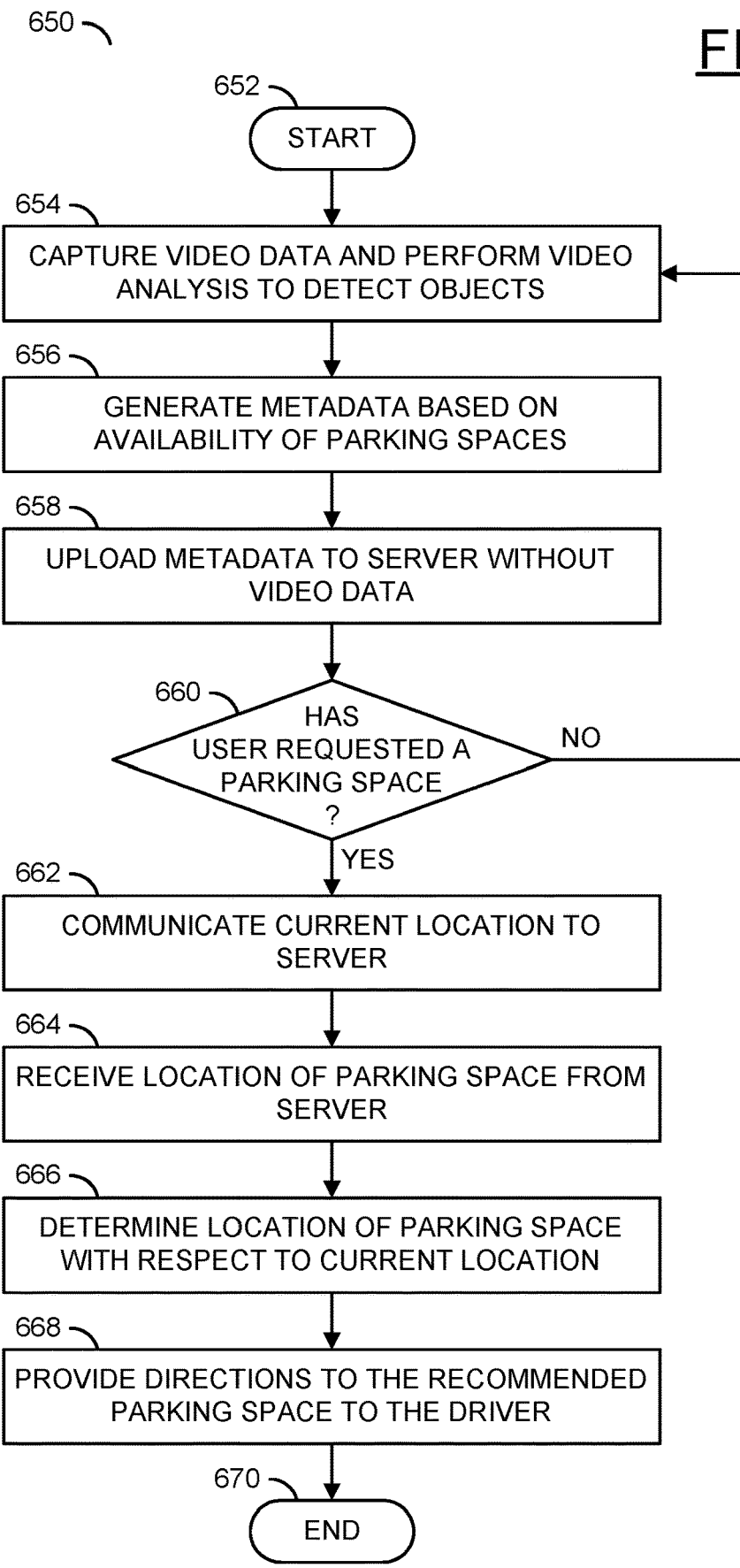
FIG. 12 is a flow diagram illustrating a method for generating metadata in response to performing computer vision analysis to detect parking spaces and receiving a parking space recommendation.

Referring to FIG. 12, a method (or process) 650 is shown. The method 650 may generate metadata in response to performing computer vision analysis to detect parking spaces and receive a parking space recommendation. The method 650 generally comprises a step (or state) 652, a step (or state) 654, a step (or state) 656, a step (or state) 658, a decision step (or state) 660, a step (or state) 662, a step (or state) 664, a step (or state) 666, a step (or state) 668, and a step (or state) 670.

The step 652 may start the method 650. In the step 654, the cameras 100a-100n may capture video data and perform computer vision analysis on the captured video data to detect objects. In an example, each of the circuits 102a-102n may perform video analysis on video data captured at the respective locations of the vehicles 200a-200n. Next, in the step 656, the circuits 102a-102n may generate metadata comprising information about the availability of parking spaces. For example, the computer vision analysis may be configured to detect objects, determine whether the objects correspond to a parking space (e.g., based on parking lines, a width and depth of the space, whether parking in the area is allowed, etc.) and determine whether the parking space is available or occupied. In the step 658, the cameras 100a-100n may upload the metadata to the metadata server 120. The metadata (e.g., the signal META) may be uploaded without communicating the corresponding video data. For example, once the video data has been analyzed to determine the availability of parking spaces, the video data may no longer be needed and may be discarded (unless used for other features such as being stored for insurance purposes). Next, the method 650 may move to the decision step 660.

In the decision step 660, the camera 100a (or the vehicle 200a or the infotainment unit 460) may determine whether the parking user has requested a parking space. The parking space may be requested using the button 464, the button 466, the user device 112a, etc. If the user has not requested a parking space then the method 650 may return to the step 654 (e.g., the capture devices 100a-100n may be configured to continually capture video data regardless of whether the user is requesting a parking space, driving to a parking space, etc.). If the user has requested a parking space, then the method 650 may move to the step 662. In the step 662, the camera system 100a may communicate the signal LOC_A to the metadata server 120. In some embodiments, the signal LOC_A may be communicated by the camera system 100a, by the user device 112a, by the vehicle 200a, by the infotainment unit 460, etc. The signal LOC_A may comprise the current location of the vehicle 200a. Next, the method 650 may move to the step 664.

In the step 664, the camera system 100a (or the user device 112a, the vehicle 200a, the infotainment unit 460, etc.) may receive the location of the parking space from the metadata server 120. The metadata server 120 may determine a parking space for the parking user and generate the signal PSPOT_A in response to the signal LOC_A. Next, in the step 666, the camera system 100a (or the user device 112a, the vehicle 200a, the infotainment unit 460, etc.) may determine the location of the parking space with respect to the current location of the vehicle 200a. In the step 668, the camera system 100a (or the user device 112a, the vehicle 200a, the infotainment unit 460, etc.) may provide directions to the recommended parking space to the driver. In one example, the directions may comprise turn-by-turn directions displayed on a GPS/GNSS device (e.g., software implemented by the infotainment unit 460 or the user device 112a). In another example, the vehicle 200a may generate the haptic feedback 470a-470n. The type of directions and/or guidance may be varied according to the design criteria of a particular implementation. Next, the method 650 may move to the step 670. The step 670 may end the method 650.

Figure 13:
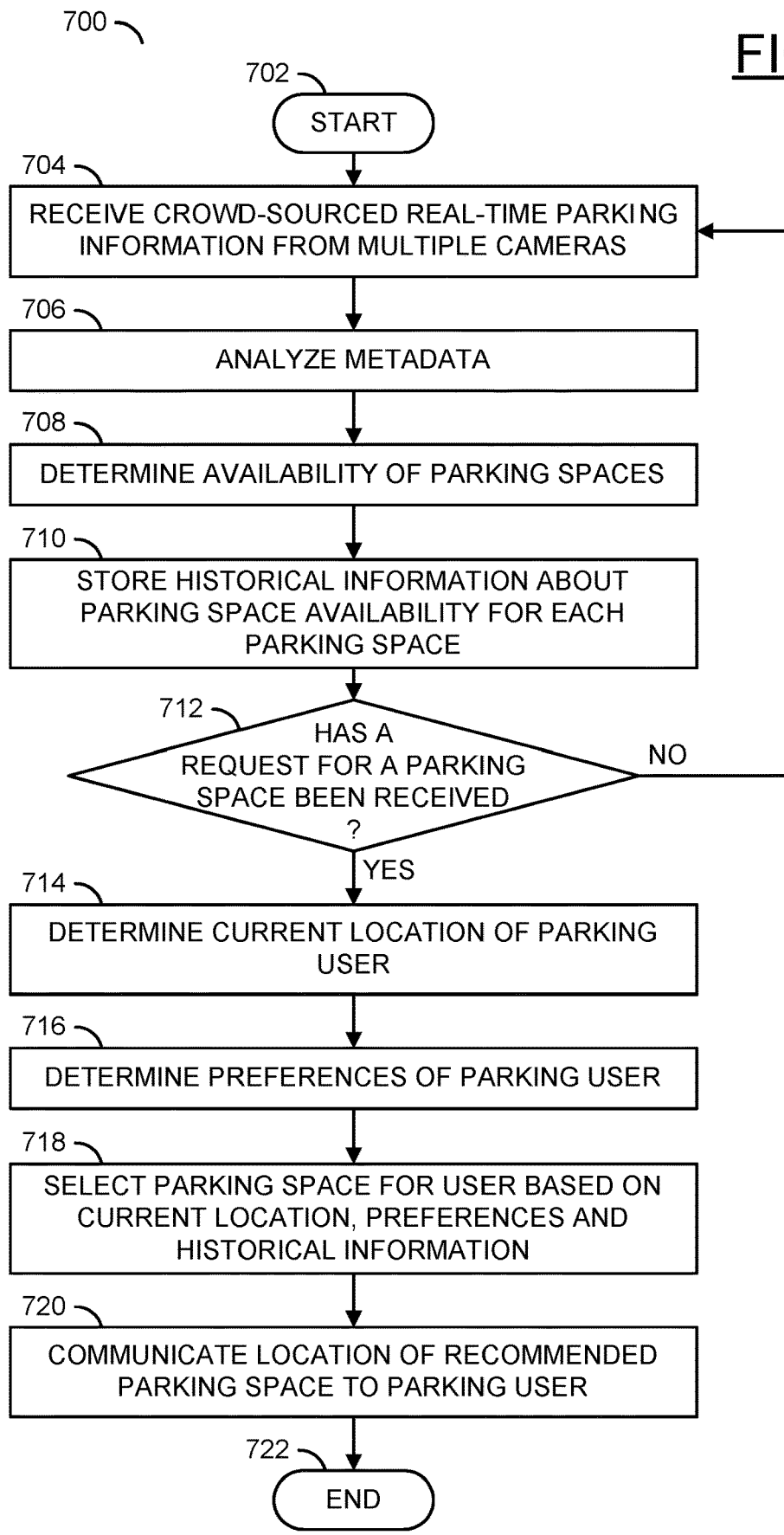
FIG. 13 is a flow diagram illustrating a method for recommending a parking space in response to a request from a parking user.

Referring to FIG. 13, a method (or process) 700 is shown. The method 700 may recommend a parking space in response to a request from a parking user. The method 700 generally comprises a step (or state) 702, a step (or state) 704, a step (or state) 706, a step (or state) 708, a step (or state) 710, a decision step (or state) 712, a step (or state) 714, a step (or state) 716, a step (or state) 718, a step (or state) 720, and a step (or state) 722.

The step 702 may start the method 700. In the step 704, the metadata server 120 may receive the crowd-sourced real-time parking information generated by multiple of the cameras 100a-100n (e.g., the signal META from each of the cameras 100a-100n). Next, in the step 706, the CPU 122 of the metadata server 120 may analyze the metadata. For example, the metadata server 120 may comprise the CPU 122 and/or the memory 124. In some embodiments, the metadata server 120 may utilize scalable processing power in a cloud computing cluster to analyze the metadata. In the step 708, the CPU 122 may be configured to determine the availability of parking spaces. The availability of parking spaces may comprise a large dataset comprising information about thousands or millions of individual parking spaces or parking lots. Next, in the step 710, the metadata server 120 may store historical information about parking space availability for each parking space using the historical data module 314. Next, the method 700 may move to the decision step 712.

In the decision step 712, the metadata server 120 may determine whether a parking user has provided a request for a parking space. For example, the parking space may be requested when the metadata server 120 receives one of the signals LOC_A-LOC_N. If no parking space has been requested, then the method 700 may return to the step 704. The metadata server 120 may continually analyze incoming metadata and track the availability of parking spaces regardless of whether a request for a parking spot has been received, while processing a parking lot request, etc. If the request for the parking spot has been received, then the method 700 may move to the step 714. In the step 714, the CPU 122 may determine the current location of the parking user (e.g., based on the current location provided in the signals LOC_A-LOC_N). Next, the method 700 may move to the step 716.

In the step 716, the CPU 122 of the metadata server 120 may determine the preferences of the parking user. In an example, the settings 172n in the user profiles 156 for each of the users 170a-170n may provide the parking preferences for the parking user. Next, in the step 718, the CPU 122 may select a parking space for the parking user. The parking space may be selected based on one or more of the current location of the parking user, the preferences of the parking user, the current availability of parking spaces near the parking user, the historical information about the parking spaces near the parking user, statistical information about the parking spaces near the parking user, etc. In the step 720, the metadata server 120 may communicate the location of the recommended parking space to the parking user. In an example, the metadata server 120 may generate the signals PSPOT_A-PSPOT_N to each of the users 170a-170n that requests a parking space. Next, the method 700 may move to the step 722. The step 722 may end the method 700.

Figure 14:
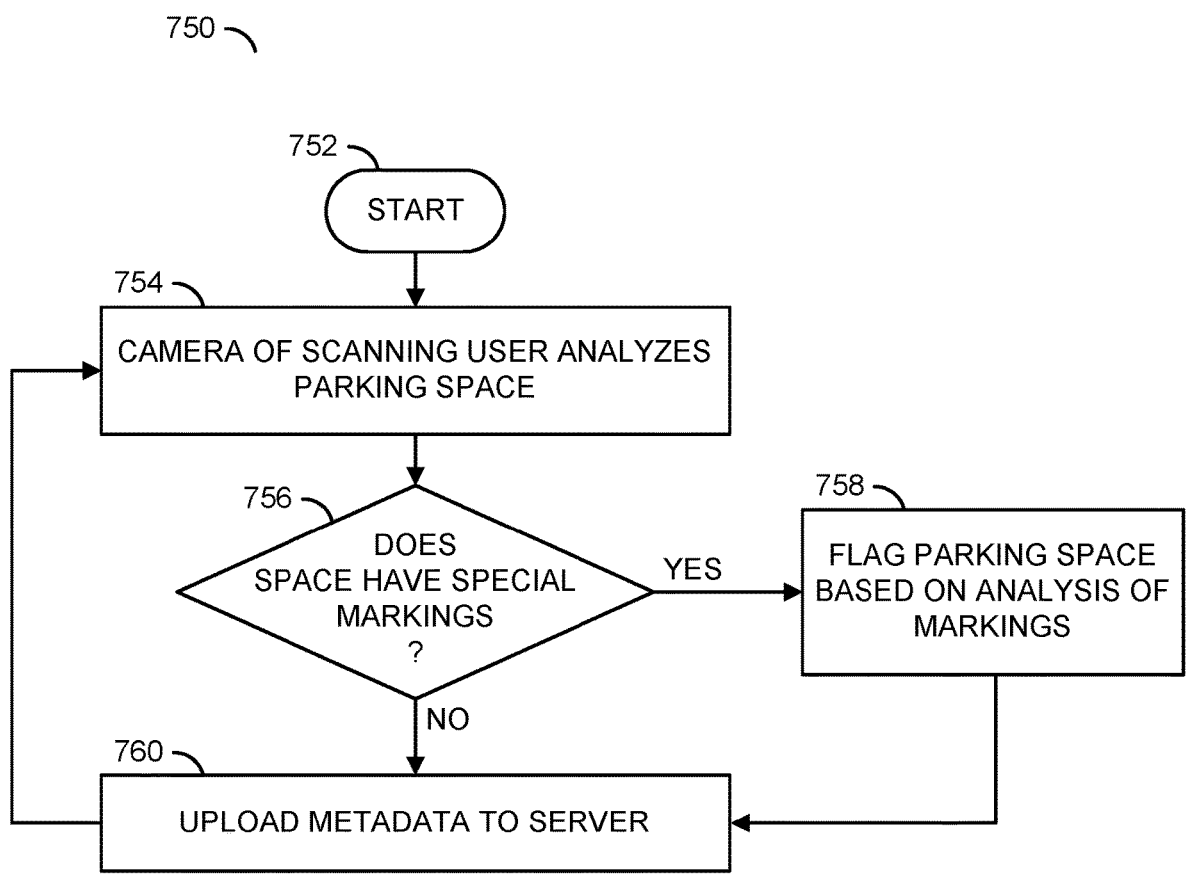
FIG. 14 is a flow diagram illustrating a method for flagging parking spaces based on special markings.

Referring to FIG. 14, a method (or process) 750 is shown. The method 750 may flag parking spaces based on special markings. The method 750 generally comprises a step (or state) 752, a step (or state) 754, a decision step (or state) 756, a step (or state) 758, and a step (or state) 760.

The step 752 may start the method 750. In the step 754, the camera 100b of a scanning user (e.g., the driver of the vehicle 200b shown in association with FIG. 7) may analyze a parking space (e.g., one of the parking spaces 412a-412l). Next, the method 750 may move to the decision step 756. In the decision step 756, the circuit 102b may determine whether the parking space has any special markings. In an example, the special marking may be a handicap symbol (e.g., painted in the spot, or on a sign located near the spot). In another example, the special marking may be an expecting mother spot (e.g., a parking space with pink painting, a sign near the parking spot, etc.). In yet another example, the special marking may be a permit notice. In still another example, the special marking may be an indication that no parking is allowed (e.g., a curb painted red, a no parking sign, etc.). The special markings may comprise a combination of object detection (e.g., detecting signs and/or painted lines), OCR (e.g., reading text on signs, reading text painted on the road, etc.), information received from third-party sources (e.g., network provided information available from a parking garage, a municipality, a private lot owner, etc.), etc. The type of special marking may be varied according to the design criteria of a particular implementation. The various object detection libraries implemented by the circuit 102b may determine which types of special markings may be detected.

In the decision step 756, if the parking space does have special markings, then the method 750 may move to the step 758. In the step 758, the circuit 102b may flag the parking space based on the analysis of the markings. In an example, the signal META may comprise metadata for each of the parking spaces 412a-412l analyzed. The metadata for a parking space with the special marking may comprise an additional data flag that may be used to enable the metadata server 120 to determine the type of special marking and/or type of parking space that has been detected. Next, the method 750 may move to the step 760.

In the decision step 756, if the parking space does not have special markings, then the method 750 may move to the step 760. In the step 760, the camera system 100b (or the user device 112a, the vehicle 200a, the infotainment unit 460, etc.) may upload the signal META to the metadata server 120. The metadata server may analyze and store the metadata 158. Next, the method 750 may return to the step 754.

Figure 15:
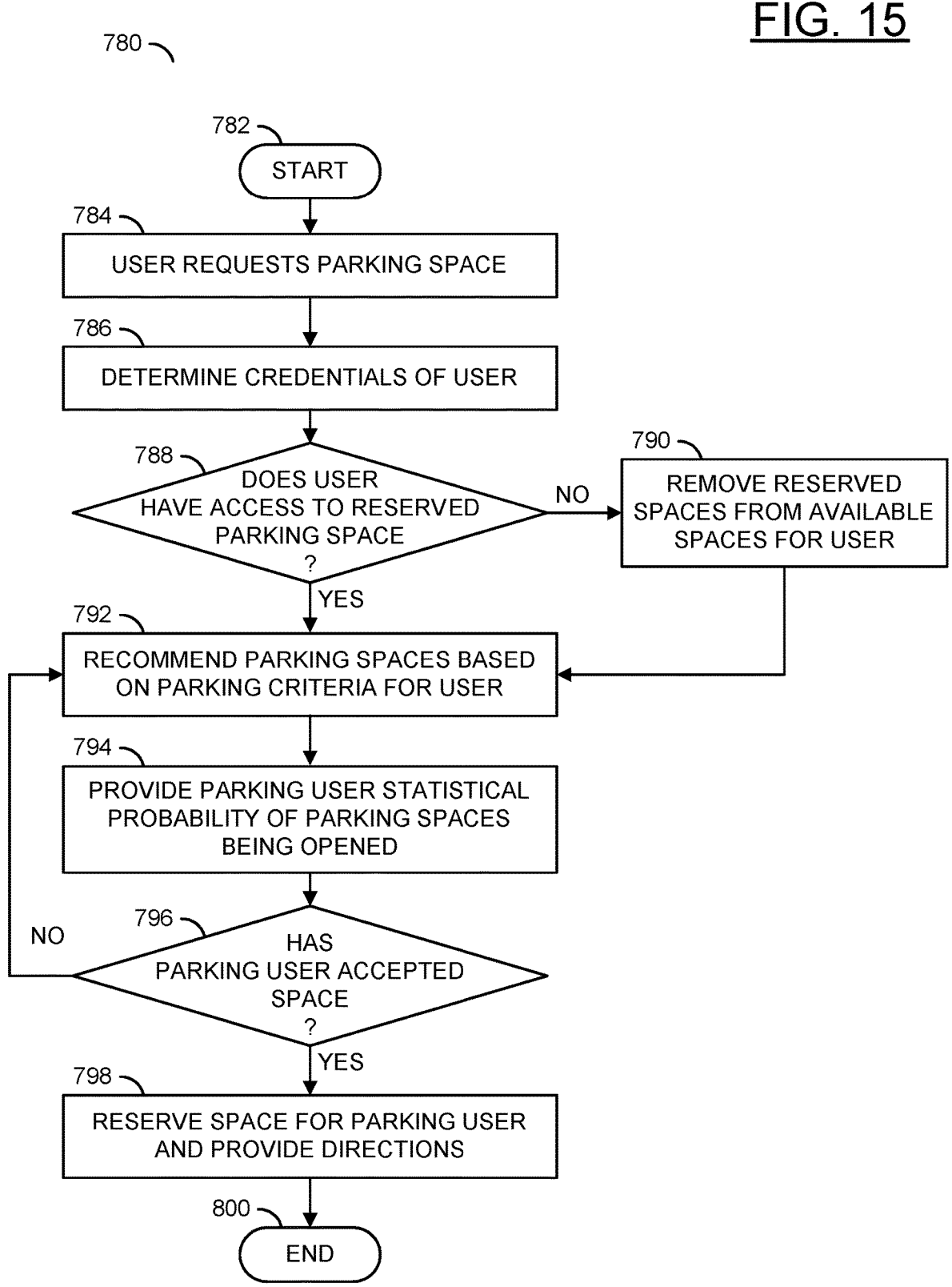
FIG. 15 is a flow diagram illustrating a method for recommending a parking space with statistical information.

Referring to FIG. 15, a method (or process) 780 is shown. The method 780 may recommend a parking space with statistical information. The method 780 generally comprises a step (or state) 782, a step (or state) 784, a step (or state) 786, a decision step (or state) 788, a step (or state) 790, a step (or state) 792, a step (or state) 794, a decision step (or state) 796, a step (or state) 798, and a step (or state) 800.

The step 782 may start the method 780. In the step 784, the parking user (e.g., the driver of the vehicle 200a shown in association with FIG. 7) may request a parking space. The metadata server 120 may receive the signal LOC_A as the request for a parking space. Next, in the step 786, the CPU 122 of the metadata server 120 may determine the credentials of the parking user. In an example, the user profiles 156 may comprise information about each of the users 170a-170n. The information about each of the users 170a-170n may comprise information about credentials (e.g., whether the user has a parking pass for a university, whether the user has a parking permit issued by a municipality, whether the user has a handicap permit, whether the user is an expecting mother, whether the user has no credentials, etc.). Next, the method 750 may move to the decision step 788.

In the decision step 788, the metadata server 120 may determine whether the user has accessed to a reserved parking space. In an example, the CPU 122 may compare the credentials of the user to any of the restrictions on the parking space. The restrictions on the parking space may be determined in response to detecting any of the flags associated with the parking space. The flags may be associated with the parking space as part of the metadata as described in association with FIG. 14. If the user does not have access to the reserved parking space (e.g., the parking space is flagged as a handicap space and the parking user does not have a handicap permit), then the method 780 may move to the step 790. In the step 790, the metadata server 120 may remove the reserved parking space from the parking spaces that may be available to the parking user. Next, the method 780 may move to the step 792. In the decision step 788, if the user does have access (e.g., permission) to the reserved parking space, then the method 780 may move to the step 792.

In the step 792, the metadata server 120 may recommend a parking space for the parking user based on the parking criteria for the user. The parking space may be selected from the list of available spaces (e.g., omitting any space that the user does not have access to). The settings 172n may comprise preferences for the user that may be used as parking criteria. In an example, the parking criteria may comprise a distance from a building, a parking space with shade, a parking space that is next to a curb, avoiding parallel parking, avoiding street parking, etc. Next, in the step 794, the metadata server 120 may provide a statistical probability of parking spaces being opened (e.g., the parking probability statistics 602-606 shown in association with FIG. 11). The statistical probability of a parking space being opened may be determined based on the historical data about parking spaces stored in the historical data module 314. Next, the method 780 may move to the decision step 796.

In the decision step 796, the metadata server 120 may determine whether the parking user has accepted the space. In an example, the user device 112a, the camera 100a, the infotainment unit 460, etc. may enable the user to select a parking space from a list of available parking spaces provided by the metadata server 120. The parking space selected may indicate that the user wants the parking space reserved and directions to the parking space. If the parking user has not accepted the parking space, then the method 780 may return to the step 792 (e.g., recommend another parking space or list parking spaces at another location). If the parking user has accepted the parking space, then the method 780 may move to the step 798.

In the step 798, the metadata server 120 may reserve the parking space for the parking user and provide directions (e.g., part of the signal PSPOT_A). In one example, reserving the parking space may comprise the metadata server 120 not recommending the reserved parking space to another user. In another example, reserving the parking space may comprise the metadata server 120 requesting another one of the users 170b-170n to hold the parking space. In yet another example, reserving the parking space may comprise the metadata server 120 communicating with a parking garage and/or municipal parking meters in order indicate that the parking space is not available. The method of reserving the parking space may be varied according to the design criteria of a particular implementation. Next, the method 780 may move to the step 800. The step 800 may end the method 780.

Figure 16:
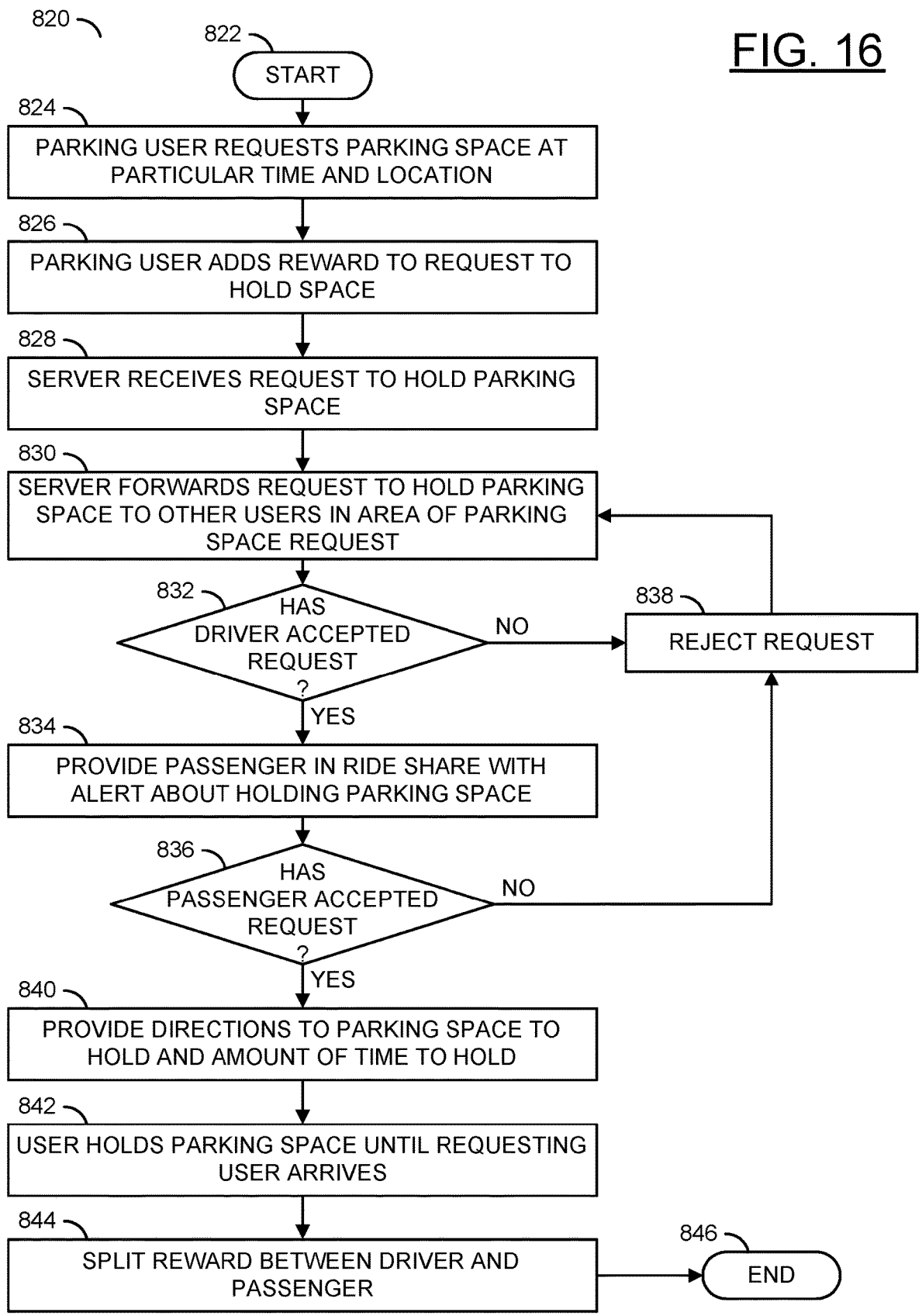
FIG. 16 is a flow diagram illustrating a method for offering a reward to a ride share driver to hold a parking space.

Referring to FIG. 16, a method (or process) 820 is shown. The method 820 may offer a reward to a ride share driver to hold a parking space. The method 820 generally comprises a step (or state) 822, a step (or state) 824, a step (or state) 826, a step (or state) 828, a step (or state) 830, a decision step (or state) 832, a step (or state) 834, a decision step (or state) 836, a step (or state) 838, a step (or state) 840, a step (or state) 842, a step (or state) 844, and a step (or state) 846.

The step 822 may start the method 820. In the step 824, the parking user (e.g., the driver of the vehicle 200a) may request a parking space. The parking space request may be communicated using the signal LOC_A. The parking space request may comprise a particular time and location. For example, the parking user may request a parking space to be reserved (e.g., a day in advance, an hour in advance, etc.). Next, in the step 826, the parking user may add the reward 574 to the request to hold the parking space. In an example, the reward 574 may be a monetary reward (e.g., offer $10 to reserve a parking space). In the step 828, the metadata server 120 may receive the request (e.g., the signal LOC_A) to hold the parking space. Next, in the step 830, the metadata server 120 may forward the request to hold the parking space to other users in the area of the parking space request. In an example, the metadata server 120 may generate the signals PSPOT_A-PSPOT_N for scanning users that may want to hold a parking space. In some embodiments, the metadata server 120 may determine the location of the parking space request and send the request to users nearby. In some embodiments, some scanning users may offer to hold parking spaces even when the parking space is not nearby. Next, the method 820 may move to the decision step 832.

In the decision step 832, the metadata server 120 may determine whether the driver has accepted the request. In an example, the circuits 102b-102n of the scanning users, the user devices 112b-112n of the scanning users, the vehicles 200b-200n of the scanning users, etc. may be configured to communicate one of the signals LOC_B-LOC_N to accept the request. If the driver does not accept the request, the method 820 may move to the step 838. In the step 838, the metadata server 120 may reject the request. Next, the method 820 may return to the step 830 (e.g., provide the request to other users). In some embodiments, the rejection of the request may be sent to the parking user to enable the parking user to increase the reward 574.

In the decision step 832, if the driver accepts the request, then the method 820 may move to the step 834. In an example, the driver may be a ride-share driver. The ride-share driver may offer ride-share services (e.g., driving around passengers for a service such as Uber, Lyft, etc.). If the ride-share driver is currently carrying a passenger, then, in the step 834, the metadata server 120 may provide the passenger in the ride share with an alert about the driver accepting the request to hold the parking space. Next, the method 820 may move to the decision step 836.

In the decision step 836, the metadata server 120 may determine whether the passenger of the ride-share has accepted the request to hold the parking space. If the passenger does not accept the request, then the method 820 may move to the step 838 (e.g., reject the request). If the passenger does accept the request, then the method 820 may move to the step 840. In the step 840, the metadata server 120 may provide the driver of the ride-share with directions to the parking space to hold and the amount of time to hold the parking space for. In some embodiments, the infotainment unit 460 and/or the user device 112b may display a map that provides a real-time location of the parking user to indicate how far away the parking user is from the parking space being held by the ride-share driver. Next, the method 820 may move to the step 842.

In the step 842, the user (e.g., the ride-share driver) may hold the parking space until the requesting user arrives. When the requesting user arrives, the ride-share driver may exit the parking space and continue driving the passenger to the original destination and the parking user may take the parking space. Next, in the step 844, the reward 574 may be split between the driver of the ride-share and the passenger of the ride-share. In an embodiment without a passenger, the method 820 may skip the steps 834-836 and the driver may receive the entire reward. Next, the method 820 may move to the step 846. The step 846 may end the method 820.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
    a capture device configured to (i) capture video, (ii) implement a processor configured to (a) perform video analysis on said captured video to extract metadata corresponding to said captured video, (iii) store said captured video and (iv) communicate with a wireless communication device; and
    a database configured to (i) communicate with said wireless communication device, (ii) receive said metadata from said wireless communication device, (iii) analyze said metadata, (iv) determine a location of an available parking space in response to (a) said analysis of said metadata and (b) a current location of a parking user and (v) communicate said location of said available parking space to said parking user, wherein
    (A) said metadata is (i) extracted by said processor of said capture device to generate information about objects present in said captured video and (ii) uploaded to said database for storage without said captured video,
    (B) said processor is configured to (i) perform computer vision on said objects present in said captured video to detect a status of a plurality of parking spaces and (ii) determine whether each of said plurality of parking spaces is said available parking space, (C) said capture device is implemented in a first vehicle of a scanning user, and (D) said parking user is in a second vehicle having said current location different than a scanning location of said first vehicle.

2. The system according to claim 1, wherein said database is configured to provide a crowd-sourced, real-time parking space detection and notification.

3. The system according to claim 1, wherein said system is configured to provide a notification to said parking user about said available parking space to prevent driver distraction.

4. The system according to claim 3, wherein said notification comprises an audio indicator configured to provide direction to said available parking space.

5. The system according to claim 3, wherein said notification comprises navigation instructions communicated to an electronic device.

6. The system according to claim 5, wherein said electronic device comprises an infotainment unit of said second vehicle.

7. The system according to claim 5, wherein said navigation instructions comprise turn-by-turn directions displayed on a digital map.

8. The system according to claim 5, wherein said navigation instructions comprise a color coded indicator configured to provide an indication visible in peripheral vision of said parking user about how close said second vehicle is to said location of said available parking space.

9. The system according to claim 1, wherein said database is configured to (i) analyze said metadata and (ii) determine a probability of a location having said available parking space in response to (a) said status of said plurality of parking spaces in said metadata and (b) an age of said metadata.

10. The system according to claim 1, wherein (i) said capture device is one of a plurality of capture devices each configured to detect said status of said plurality of parking spaces and (ii) said database is configured to (a) receive said metadata from said plurality of capture devices and (b) track statistics of said status of said plurality of parking spaces based on vision based analytics from said metadata.

11. The system according to claim 1, wherein said processor is configured to (i) identify parked vehicles in said plurality of parking spaces, (ii) identify said plurality of parking spaces that are available and (iii) perform geolocation to determine said location of each of said plurality of parking spaces.

12. The system according to claim 1, wherein said database is configured to (i) generate historical data about said status of said plurality of parking spaces and (ii) predict an availability of said plurality of parking spaces based on said historical data.

13. The system according to claim 12, wherein said database is configured to (i) determine a reserved status of said plurality of parking spaces based on said historical data and (ii) provide a notification to said parking user about an unavailability of said parking spaces with said reserved status.

14. The system according to claim 12, wherein said database is configured to (i) analyze said metadata and said historical data and (ii) estimate an amount of time that said available parking space will remain unoccupied.

15. The system according to claim 1, wherein said computer vision is configured to determine a presence of a parking space in response to detecting at least one of parking lines, parking signs, a curb color, and handicap symbols.

16. The system according to claim 1, wherein (i) said parking user initiates a request for said location of said available parking space, (ii) said request comprises said current location of said parking user and a parking criteria and (iii) said database is configured to analyze said metadata to determine said location of said available parking space that meets said parking criteria.

17. The system according to claim 1, wherein (i) said database is configured to generate a request, (ii) said request is presented to a parked user and (iii) said request provides an option for said parked user to hold a parking space for said parking user.

18. The system according to claim 17, wherein said request (i) is provided to a smartphone and (ii) provides an estimated time of arrival of said parking user.

19. The system according to claim 17, wherein said parked user receives a reward for accepting said request to hold said parking space for said parking user.

20. The system according to claim 1, wherein said database is further configured to (i) communicate with a parking service system provided by at least one of (a) a parking garage and (b) municipal parking meters, (ii) receive parking information about available parking spaces from said parking service system, (iii) add said parking information to said metadata and (iv) reserve said available parking space for said parking user in said parking service system.

* * * * *